Aug. 17, 1954  E. LAKATOS ET AL  2,686,636
CURVED COURSE PREDICTOR

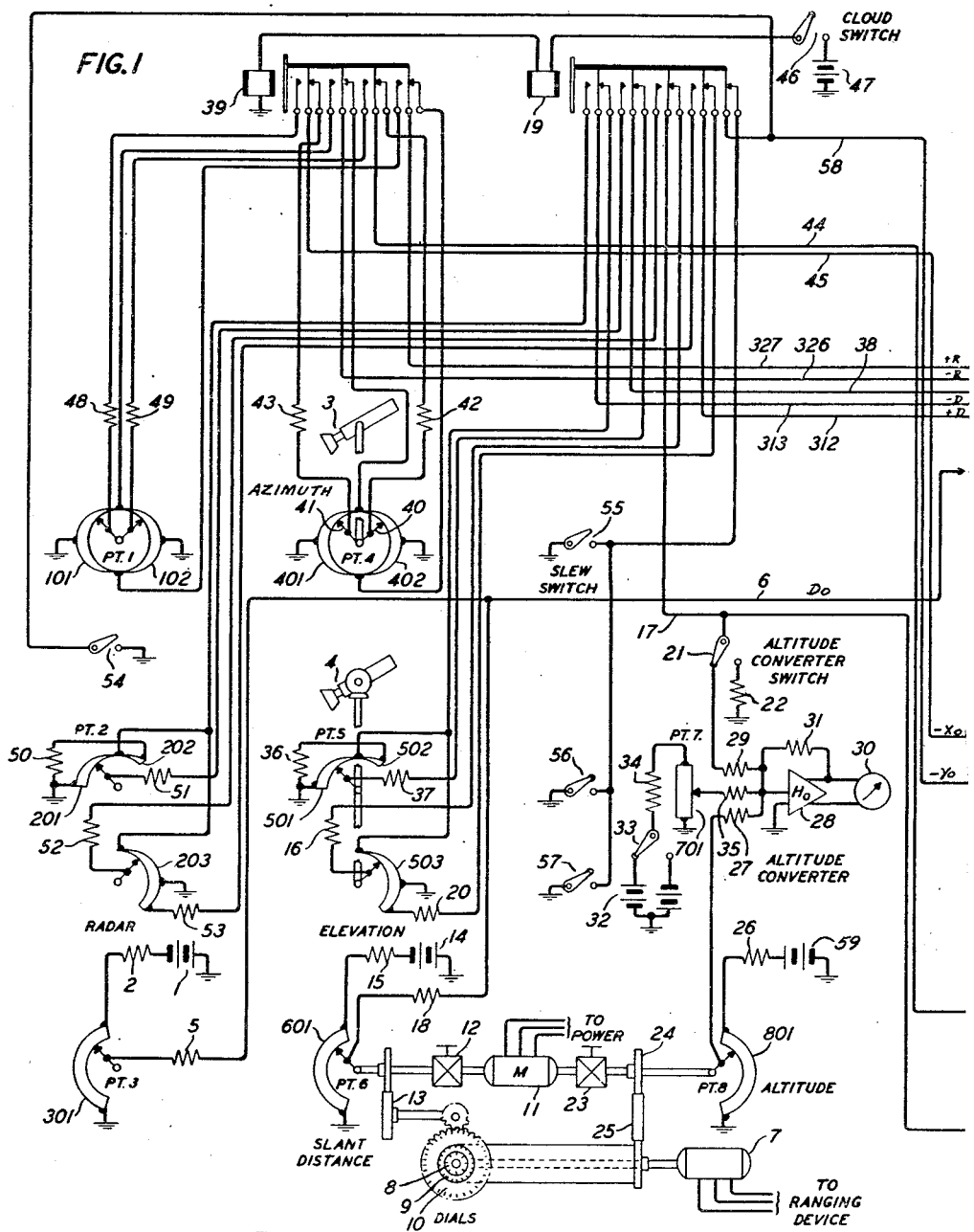

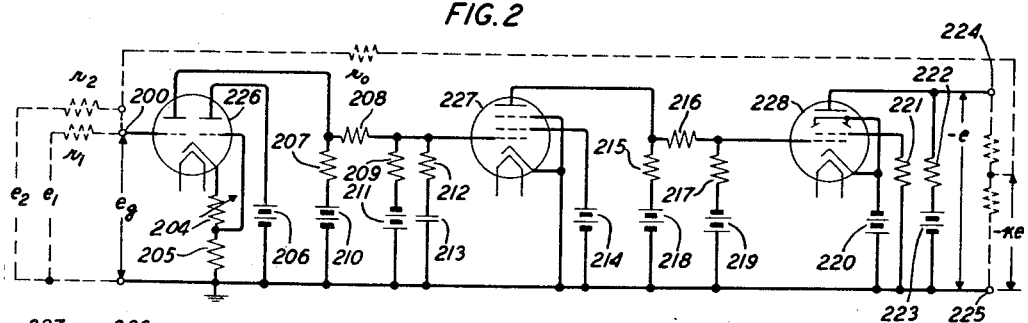
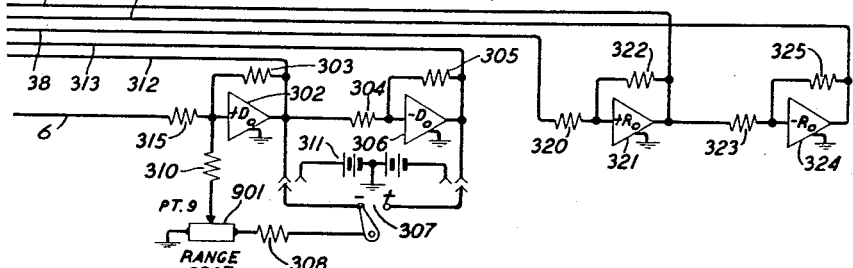
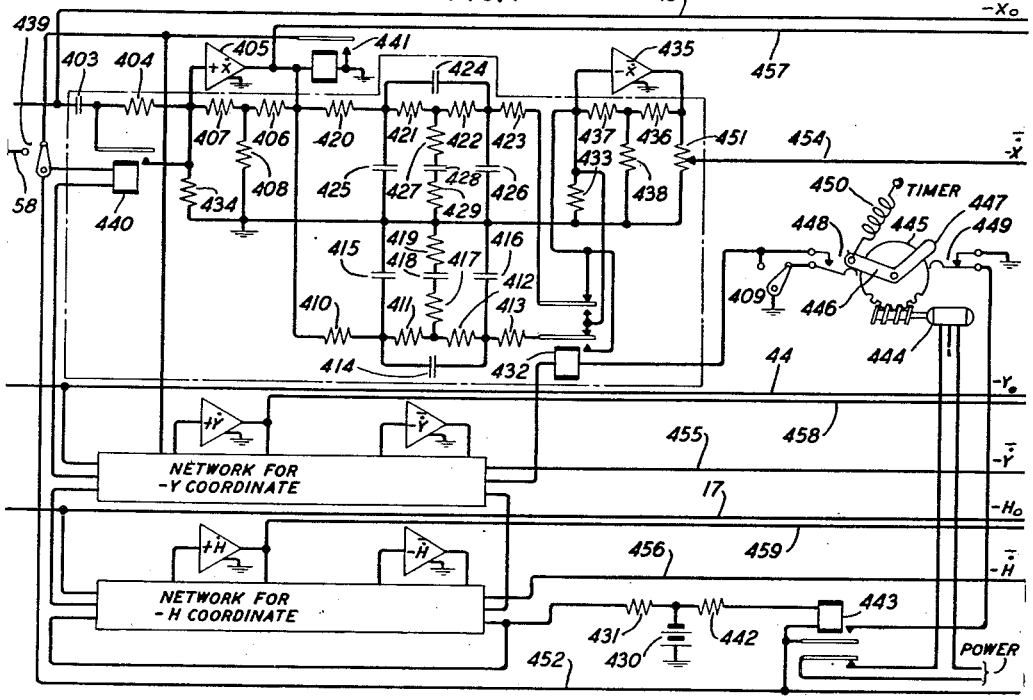

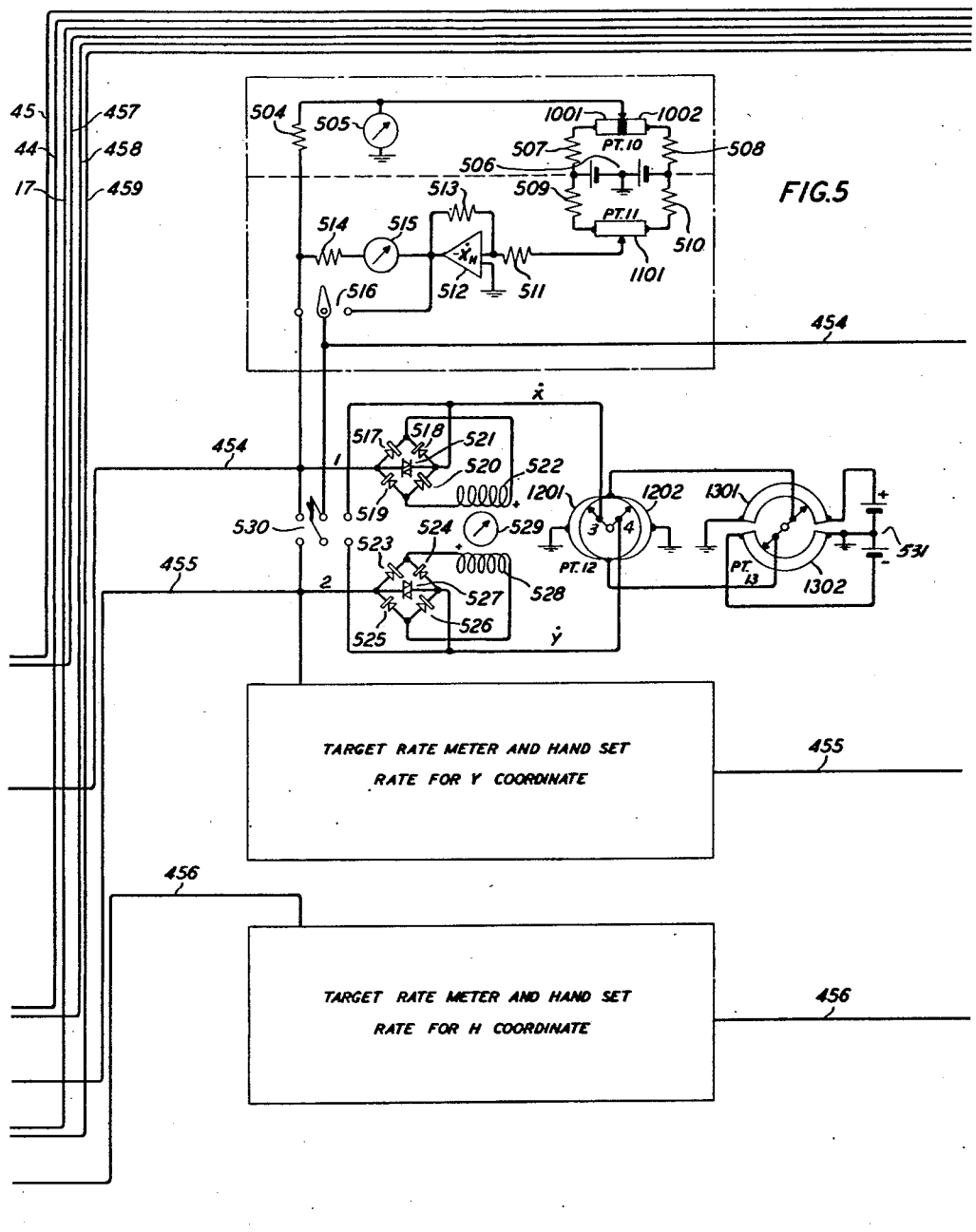

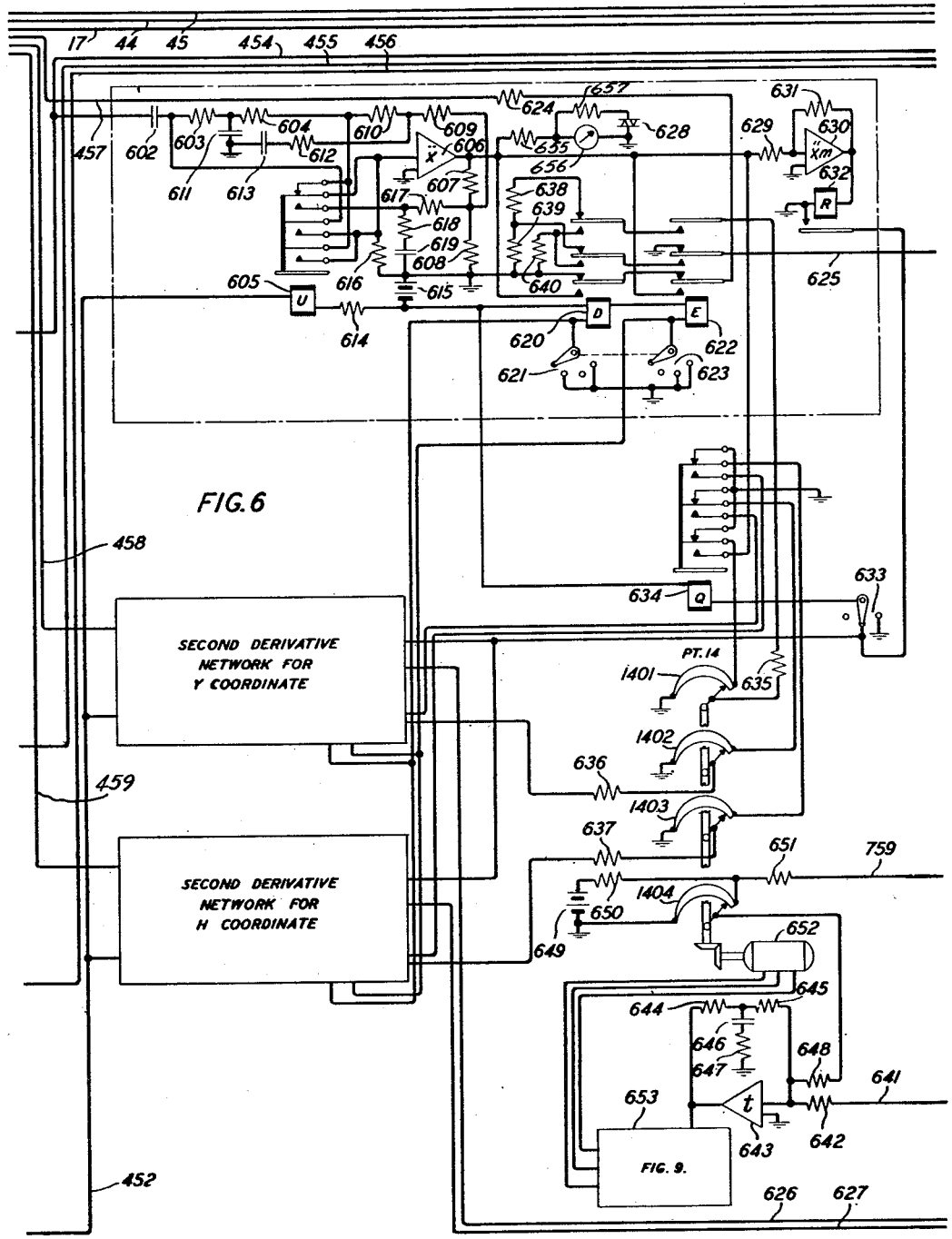

Filed June 26, 1946  16 Sheets-Sheet 5

INVENTORS: E. LAKATOS
H. G. OCH
BY
W. T. Dawson
ATTORNEY

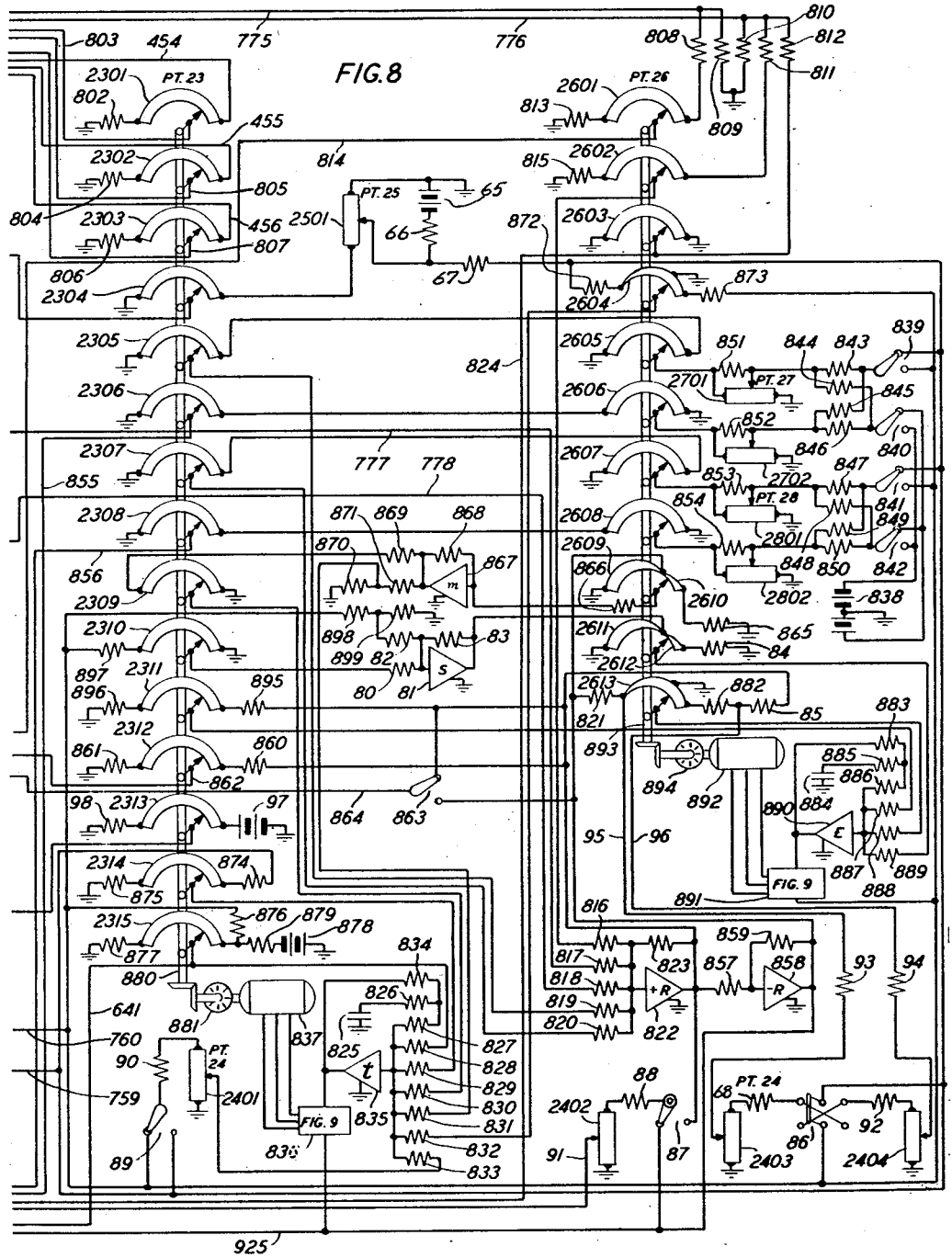

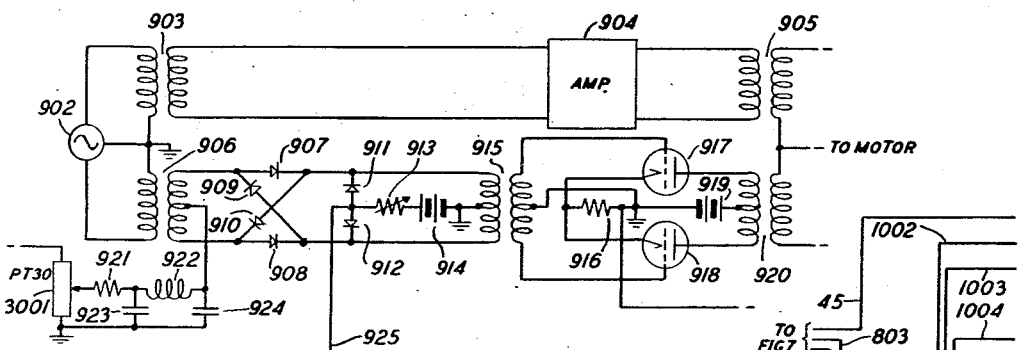
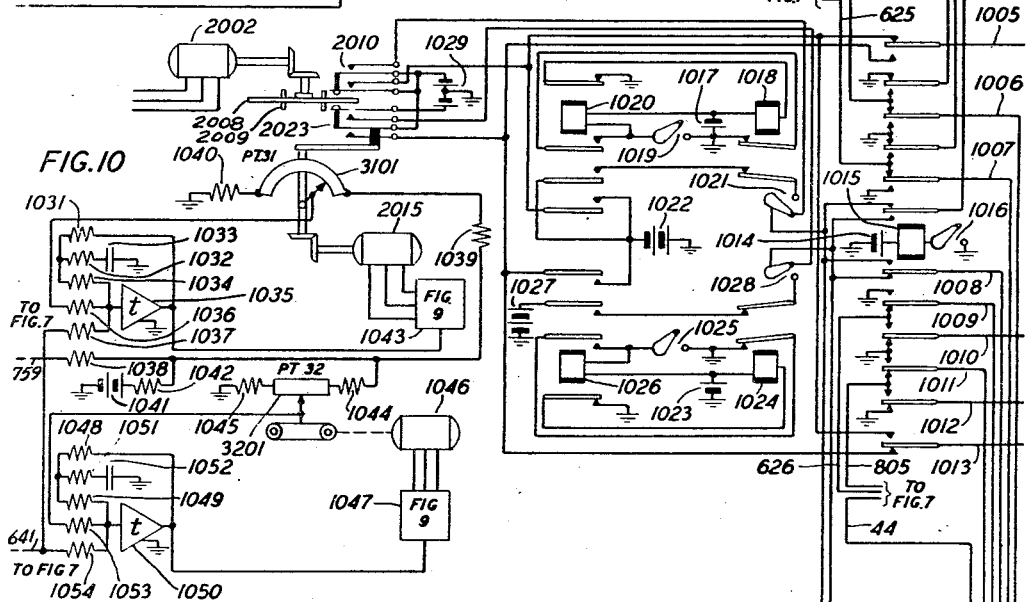

Aug. 17, 1954  E. LAKATOS ET AL  2,686,636
CURVED COURSE PREDICTOR
Filed June 26, 1946  16 Sheets-Sheet 9

INVENTORS: E. LAKATOS
H. G. OCH
BY
W. P. Dawson
ATTORNEY

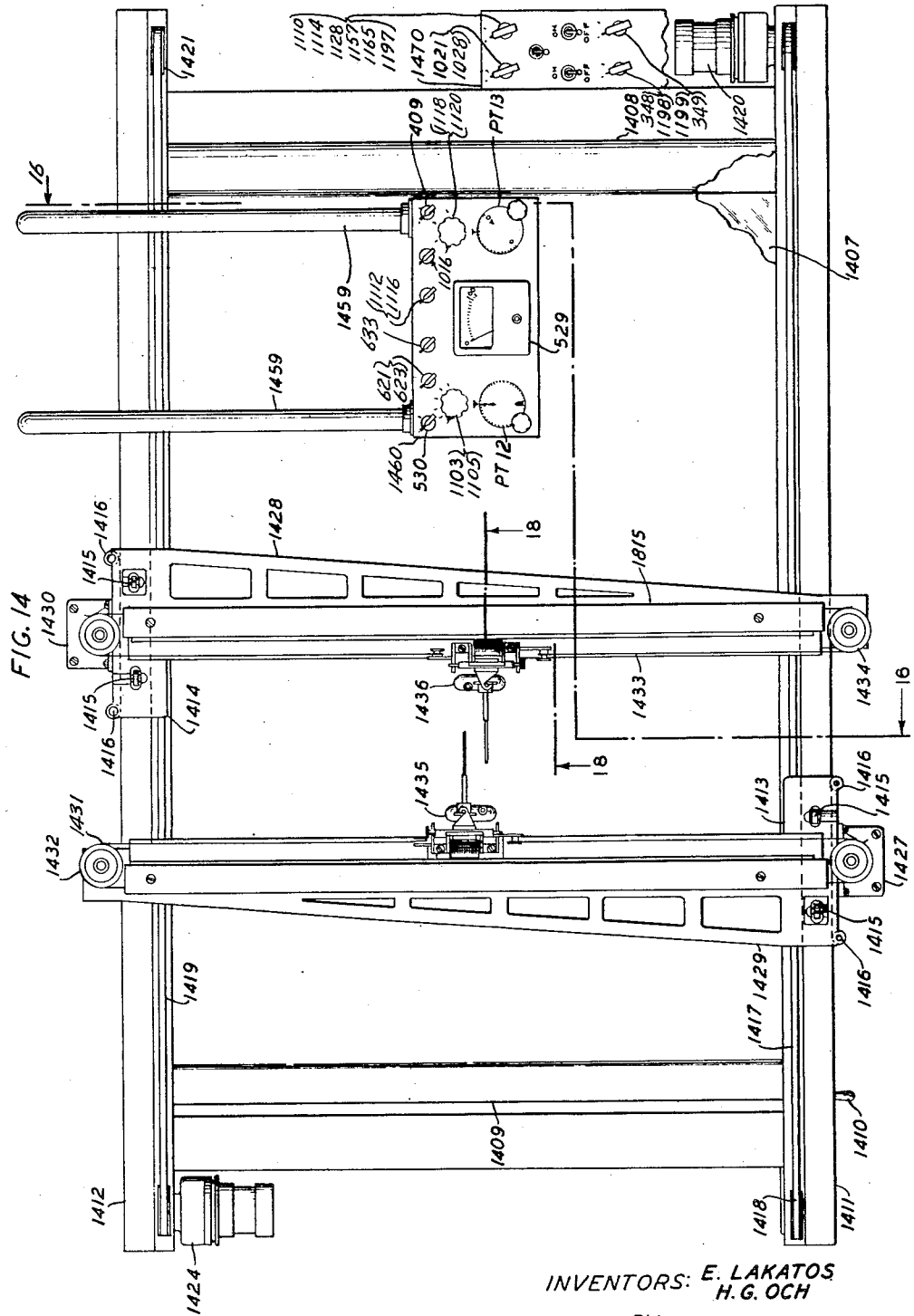

Aug. 17, 1954 — E. LAKATOS ET AL — 2,686,636
CURVED COURSE PREDICTOR
Filed June 26, 1946 — 16 Sheets-Sheet 11

INVENTORS: E. LAKATOS
H. G. OCH
BY
*/s/ W. Dawson*
ATTORNEY

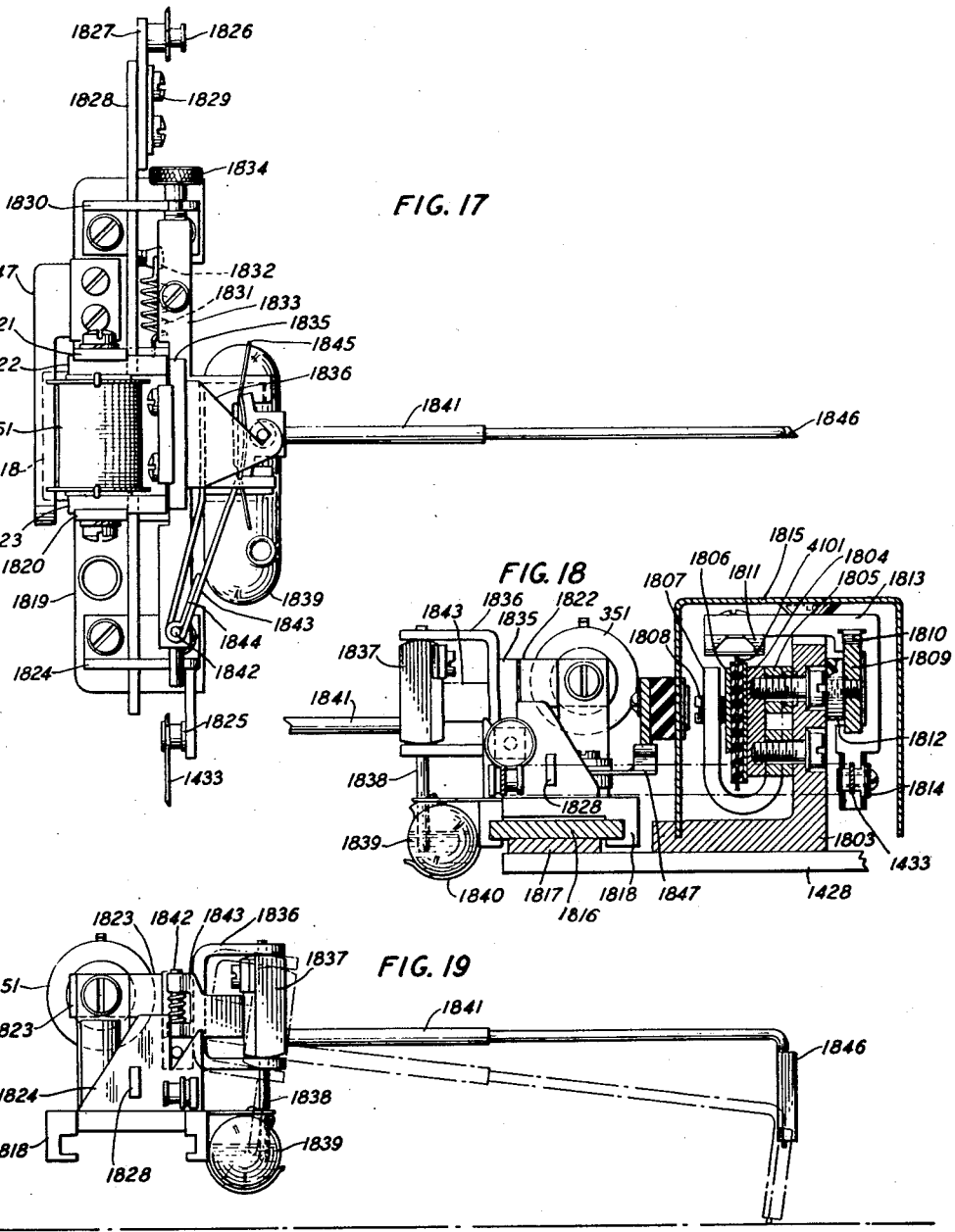

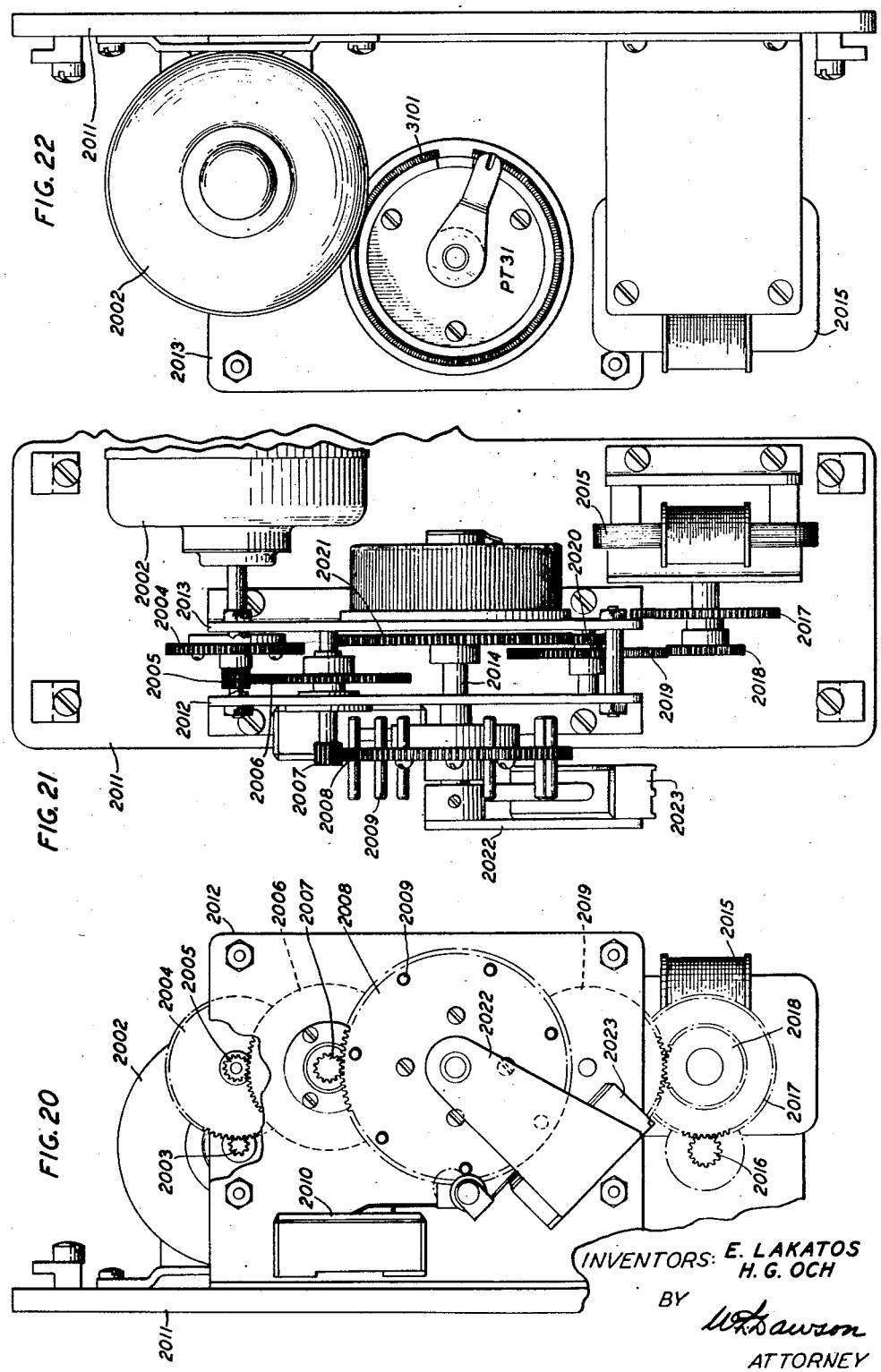

Aug. 17, 1954  E. LAKATOS ET AL  2,686,636
CURVED COURSE PREDICTOR
Filed June 26, 1946  16 Sheets-Sheet 14

INVENTORS: E. LAKATOS
H. G. OCH
BY
W. R. Dawson
ATTORNEY

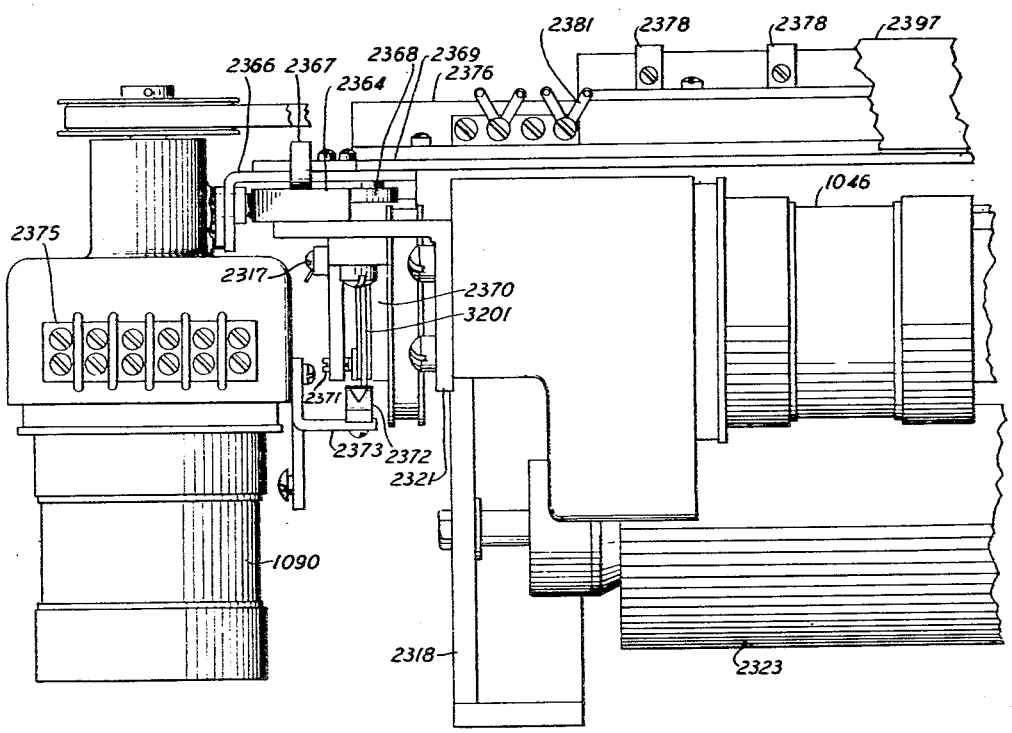

Aug. 17, 1954     E. LAKATOS ET AL     2,686,636
CURVED COURSE PREDICTOR
Filed June 26, 1946     16 Sheets-Sheet 16
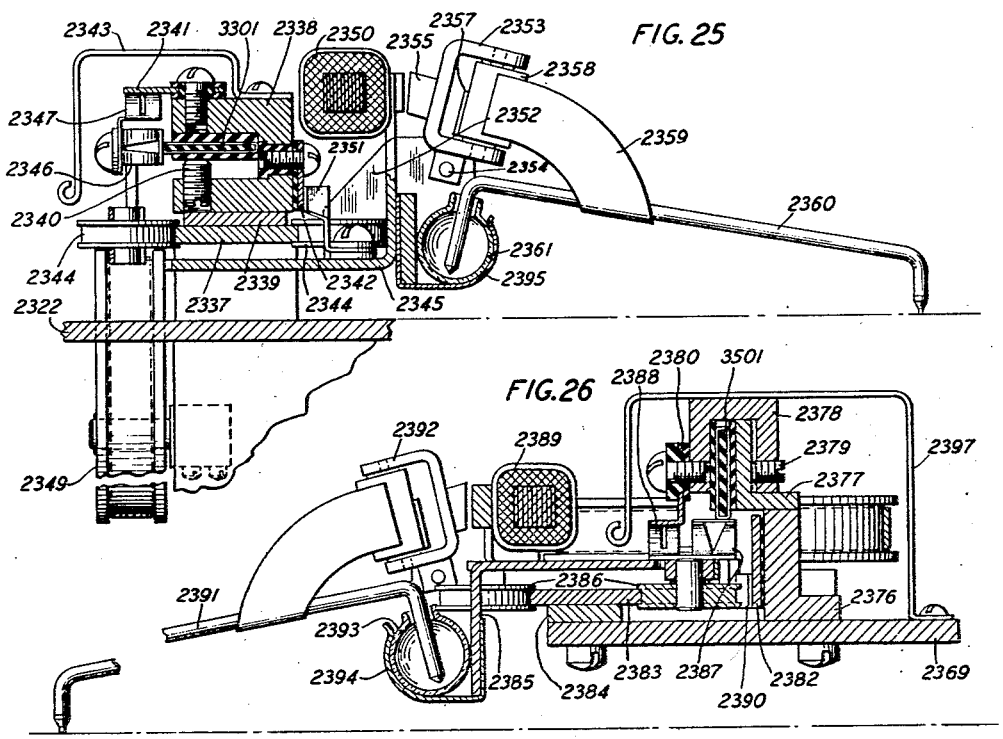
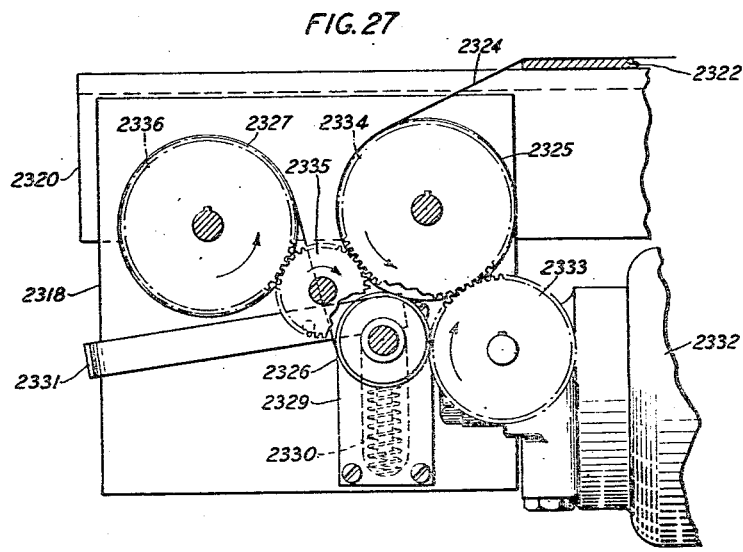
INVENTORS: E. LAKATOS
H. G. OCH
BY
ATTORNEY Patented Aug. 17, 1954

2,686,636

UNITED STATES PATENT OFFICE 2,686,636

CURVED COURSE PREDICTOR

Emory Lakatos, Cranford, and Henry G. Och, Short Hills, N. J., assignors to Bell Telephone Laboratories, Incorporated, New York, N. Y., a corporation of New York Application June 26, 1946, Serial No. 679,353

13 Claims. (Cl. 235—61.5)

This invention relates to gun data computers, and particularly to electromechanical computers for predicting the future position of a target moving with accelerated motion.

Gun data computers are controlled by observations of the present position of a target and predict what the future position of the target will be after the lapse of the time of flight of the shell. In prior computers, the prediction is based upon unaccelerated motion of the target, such as motion in a straight line at constant speed.

The present computer is associated with plotting boards which continuously plot the present and predicted positions of the target. The operator of the plotting board can visually project the plot of the present position of the target to the probable future position and compare this visually projected future position with the current plot of the predicted position. If there be a discrepancy between the future and predicted positions, from this discrepancy and the prior plot of the present position, the operator can estimate the probable future course of the target. Facilities are provided in the present computer to change the basis of the prediction from unaccelerated motion to various other types of motion.

The object of the present invention is a gun data computer which can predict the position of a target moving with accelerated motion.

A feature of the invention is means for predicting the position of a target moving on a regular curve.

Another feature of the invention is means for predicting the position of a target moving on a course lying between a regular curve and a tangent to the curve.

A further feature of the invention is a meter indicating when the motion of a target is accelerated.

Other features of the invention are means for producing physical quantities proportional to other quantities controlled by observations of the target to be approximately proportional to the target rates along predetermined coordinates.

Other features and advantages of the invention will be apparent from the specification and drawings, in which:

Fig. 1 schematically shows the observing equipment;

Fig. 2 schematically shows a summing amplifier;

Fig. 3 shows amplifiers associated with Fig. 1;

Fig. 4 schematically shows the first derivative and smoothing networks;

Fig. 5 schematically shows the target rate meters and apparatus for supplying quantities proportional to hand set rates;

Fig. 6 schematically shows the second derivative and smoothing networks;

Fig. 7 schematically shows equipment for computing and indicating the gun order for azimuth or train and the fuse number;

Fig. 8 schematically shows equipment for computing and indicating the time of flight of the shell and the gun order for quadrant elevation;

Fig. 9 schematically shows a motor modulator amplifier;

Figs. 10 and 11 schematically show equipment for controlling plotting boards associated with the computer;

Fig. 12 shows the relationships of Figs. 1 to 11; and

Figs. 13A, 13B, 13C, 13D, diagrammatically show the geometrical relationships involved;

Fig. 14 is a top view of a board, associated with the computer, for plotting the horizontal position of the target;

Fig. 17 is a top view of one type of plotting pen;

Fig. 18 is an end view of the pen shown in Fig. 17, and a section along line 18—18, Fig. 14;

Fig. 19 is another end view of the pen shown in Fig. 17;

Fig. 20 is a front view of an automatic marking device;

Fig. 21 is a top view of the device shown in Fig. 20;

Fig. 22 is a rear view of the device shown in Fig. 20;

Fig. 24 is a partial end view of the board shown in Fig. 23;

Figs. 25, 26 are side views in part section of the pens used with the board of Fig. 23; and, Fig. 27 is a section of the board shown in Fig. 23 showing the paper sheet take up.

Figure 7:
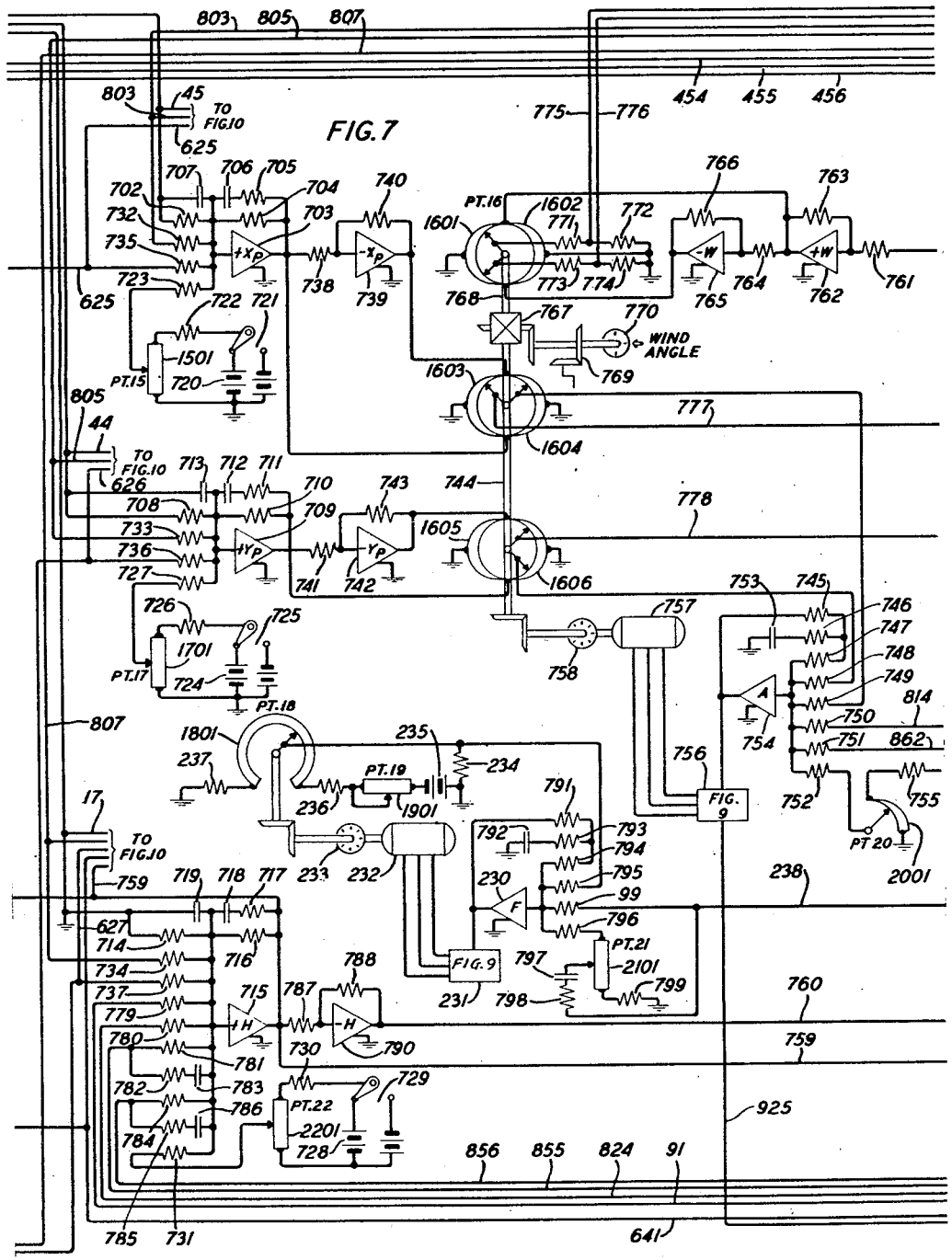

The slant distance to the target may be continuously observed by a radar, or an optical range finder; or the height of the target may be continuously observed by a radar or an optical height finder.

In Fig. 1, a grounded source of power 1 is connected through a resistor 2 and the winding 301 of potentiometer PT3 to ground. The brush of potentiometer PT3 is connected to the slant distance shaft of a radar, and is moved by the shaft to select a voltage with respect to ground proportional to the slant distance; and is connected through resistor 5, connection 6 and resistor 315, Fig. 3, to the input circuit of amplifier 302, of the type shown in Fig. 2.

If an optical range finder is used, a synchronous transmitter driven by the slant distance shaft of the range finder is connected to the synchronous receiver 7, Fig. 1. The receiver drives the center dial 8, of three concentric dials 8, 9, 10. The motor 11, through the speed reducing device 12 and gears 13 drives the outer dial 10. The operator adjusts the device 12 until the dial 10 is turning in synchronism with the dial 8.

A grounded source of power 14 is connected through resistor 15 and the winding 601 of potentiometer PT6 to ground. The brush of potentiometer PT6 is connected to the device 12 and is moved to select a voltage with respect to ground proportional to the slant distance. This brush is connected through resistor 18, connection 6 and resistor 315, Fig. 3, to the input circuit of amplifier 302.

When either of the brushes of potentiometers PT3 or PT6, of Fig. 1, is in use, the other brush is preferably disconnected, or rotated to the grounded end of the associated winding.

The amplifier shown in Fig. 2 employs three vacuum tubes 226, 227, 228 having the usual cathodes, heated by heater elements connected to a suitable source of power (not shown). The vacuum tube 226 is preferably a twin triode having the cathode connected through a variable resistor 204 and resistor 205 to ground. A grounded source of positive potential 206 is connected to the anode, and the control electrode is connected to the junction of resistors 204, 205. As disclosed in United States Patent 2,308,997, January 19, 1943, S. E. Miller, this connection stabilizes the twin triode against variations in cathode emission.

The input terminal 200 is connected to the control electrode of the left-hand section of the twin triode 226. The anode of this section is connected to the control electrode of the pentode 227 by an interstage coupling network, of the type disclosed in United States Patent 1,751,527, March 25, 1930, H. Nyquist, including resistors 207, 208, 209 and the sources of power 210, 211. Resistor 212 and capacitor 213, connected in serial relationship across the input circuit of pentode 227, correct for any phase shifts in the amplifier due to parasitic capacitances.

The cathode and suppressor grid of the pentode 227 are connected to ground, and the screen grid is connected to a grounded source of power 214.

The anode of the pentode 227 is coupled to the control grid of the beam power vacuum tube 228 by a coupling network including resistors 215, 216, 217 and the sources of power 218, 219.

The cathode, and beam screen, of the tube 228 are connected to the negative pole of the grounded source of power 220. The screen grid is grounded through resistor 221. The anode is connected through resistor 222, to the positive pole of the grounded source of power 223.

The biasing voltage applied to the control electrode of tube 228, the resistance of resistor 222 and the magnitudes of the potentials of the sources 220, 223 are so selected that, when no signal voltage is applied to the input terminal 200, these elements form a balanced bridge and no potential difference will be produced across the output terminals 224, 225. If desired, a potentiometer (not shown) may be connected to supply a small adjustable potential to the input terminal 200 so that, in the absence of a signal voltage applied to the terminal 200, the potential difference between the output terminals 224, 225 may be adjusted precisely to zero.

A potential divider, such as the winding of a potentiometer, or two resistors in series, may be connected across the output terminals 224, 225. The brush of this potentiometer, or the junction of the resistors, is connected to the input terminal 200 through a resistor $r_0$. If the full output potential is to be applied to the feedback path, the potential divider may be omitted, and resistor $r_0$ connected directly from terminal 224 to terminal 200.

As the amplifier shown in Fig. 2 has an odd number of stages, when a potential of one polarity with respect to ground is connected to the input terminal 200, the potential with respect to ground of the output terminal 224 will be of the opposite phase, that is, the amplifier reverses the polarity of the potential applied to the input terminal 200.

Let a source of voltage $e_1$ be connected through a resistor of resistance $r_1$ to the input terminal 200, let the potential difference between the terminal 200 and ground be $e_g$, the potential difference between terminals 224, 225 be $-e$, the fraction of this potential applied to the feedback be $-Ke$, the resistance of the feedback resistor be $r_0$ and the voltage amplification of the amplifier be $m$.

The resistors 204, 205 impress a positive bias on the cathode of the twin triode 226, thus the control electrode of the twin triode 226 will not draw any current.

As the amplifier reverses the polarity with respect to ground of the applied voltage, a current $i$ can flow from ground through the source $e_1$; resistors $r_1$ and $r_0$; through the output circuit to ground $$i = \frac{e_1 - Ke}{r_1 + r_0}$$

and, as $$-e = me_g$$

$$i = \frac{e_1 + Kme_g}{r_1 + r_0}$$

as $$e_g = e_1 - ir_1$$

$$e_g = e_1 - \left(\frac{e_1 + Kme_g}{r_1 + r_0}\right) r_1$$

thus $$e_g\left(1 + \frac{Kmr_1}{r_1 + r_0}\right) = e_1\left(1 - \frac{r_1}{r_1 + r_0}\right)$$

$$e_g = e_1 \frac{r_0}{r_1} \left| \frac{1}{1 + Km + \frac{r_0}{r_1}} \right|$$

$$-e = e_1 \frac{r_0}{r_1}\left(\frac{1}{K + \frac{1}{m}\left(1 + \frac{r_0}{r_1}\right)}\right) \quad (1)$$

For a three stage amplifier, $m$ may be 30,000 to 50,000, let $m=40,000$, $K=1$ and let $r_0=r_1$, then $$-e = e_1\left(\frac{1}{1 + \frac{2}{40,000}}\right) = 0.99995e_1$$

that is, the output voltage is very nearly equal to the input voltage.

Let the maximum value of $e$ be say 120 volts, then the maximum value of $e_g = .003$ volt. That is, viewed from the source $e_1$, the input circuit appears to have a very low impedance.

When $K=1$, and as $$\frac{r_0}{r_1}$$

is small compared to $m$, Equation 1 will become $$-e = e_1 \frac{r_0}{r_1}$$

that is, the amplification of the input voltage is proportional to the ratio of the resistances of the feedback and input resistors.

Assume two sources $e_1$, $e_2$, are connected through resistors of resistance $r_1$, $r_2$, to the input circuit, that currents $i_1$, $i_2$, $i_0$, flow in resistors $r_1$, $r_2$, $r_0$, and let $K=1$. As $e_g$ is small, $e_1 = i_1 r_1$; $e_2 = i_2 r_2$; $-e = i_0 r_0$; $i_1 + i_2 = -i_0$ thus $$\frac{-e}{r_0} = \frac{e_1}{r_1} + \frac{e_2}{r_2}$$

or $$-e = e_1 \frac{r_0}{r_1} + e_2 \frac{r_0}{r_2} \qquad (2)$$

if $r_1 = r_2 = r_0$, then $-e$ is the sum of $e_1$ and $e_2$.

Assume a grounded source of potential $e_1$ is connected through a capacitor of capacity C and a resistor of resistance $r_1$ to the terminal 200, and that $e_g$ is small. Let $i$ be the current from the source $e_1$, then $$e_1 = r_1 i + \frac{1}{C} \int i \, dt$$

and differentiating $$\frac{de_1}{dt} = r_1 \frac{di}{dt} + \frac{i}{C}$$

or $$\frac{di}{dt} + \frac{1}{r_1 C} i - \frac{1}{r_1} \frac{de}{dt} = 0$$

Thus $$i = C \frac{de}{dt}(1 - \epsilon^{-t/r_1 C}) = -\frac{e}{r_0}$$

where $\epsilon = 2.718$ and $$-e = C r_0 \left( \frac{de}{dt}(1 - \epsilon^{-t/r_1 C}) \right) \qquad (3)$$

After the transient term has died down, $$-e = C r_0 \frac{de_1}{dt}$$

that is, the output voltage $-e$ is proportional to the first derivative, or rate of change, of the applied voltage $e_1$.

If the current drawn by the load tends to reduce the output voltage of the amplifier, this reduction will cause a change in $e_g$ which restores the output voltage to its original value. The amplifier thus acts as a constant voltage generator, and, viewed from the load, appears as a generator of very low impedance, generally as an impedance of about one ohm.

All of the amplifiers in the computer which are of the type shown in Fig. 2, are indicated by small triangles, the base representing the input circuit and the apex the output circuit, and are marked with a suitable symbol designating the quantity represented by the output voltage.

The sources 1 and 14, Fig. 1, are of negative polarity, thus, due to the reversal of polarity, the output voltage of amplifier 302, Fig. 3, will be proportional to $+Do$, the slant distance from the range finder, or radar, to the present position of the target. A feedback resistor 303 is connected from the output to the input circuit of amplifier 302.

The output circuit of amplifier 302 is connected through resistor 304 to the input circuit of amplifier 306, having a feedback resistor 305. The output voltage of amplifier 306 will be proportional to $-Do$, the negative of the slant distance.

Range spot

The output circuits of amplifiers 302, 306 are respectively connected to the contacts of switch 307. The blade of switch 307 is connected through resistor 308 and the winding 901 of potentiometer PT9 to ground. The brush of potentiometer PT9 is connected through resistor 310 to the input circuit of amplifier 302. When the blade of switch 307 is on the left-hand contact, the output circuit of amplifier 302 is connected to ground through the winding of potentiometer PT9 and the voltage selected by the brush of potentiometer PT9 and supplied to the input circuit of amplifier 302 will be of opposite polarity to the voltage supplied to resistor 315, thus reducing the output voltage of amplifier 302. On the other hand, when the blade of switch 307 is on the right-hand contact, the voltage supplied by the brush of potentiometer PT9 is of the same polarity as the voltage supplied to resistor 315 and increases the output voltage of amplifier 302. As the current supplied to the winding of potentiometer PT9 is proportional to the slant distance, the change produced by any given setting of potentiometer PT9 will be proportional to the slant distance, thus, a scale, graduated in percentage of slant distance, may be associated with the brush of potentiometer PT9.

If desirable, the range spot may be arranged to change the slant distance by amounts expressed, say, in yards. The contacts of switch 307 are disconnected from the output circuits of the amplifiers 302, 306 and connected to the poles of a suitable source of power 311, having an intermediate point grounded. In this case, a scale, graduated in yards may be associated with the brush of potentiometer PT9.

Figure 13A:
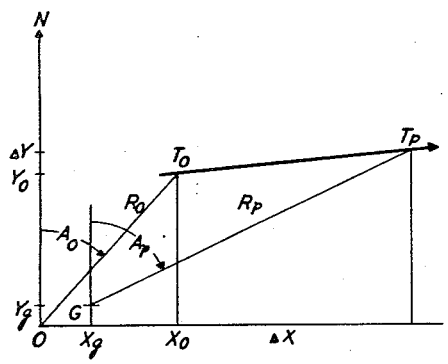
Figure 13B:
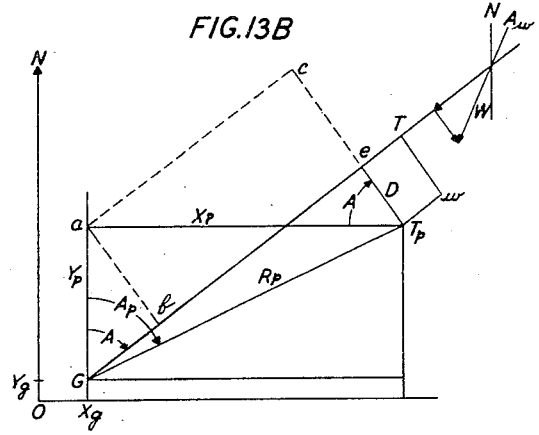
Figure 13C:
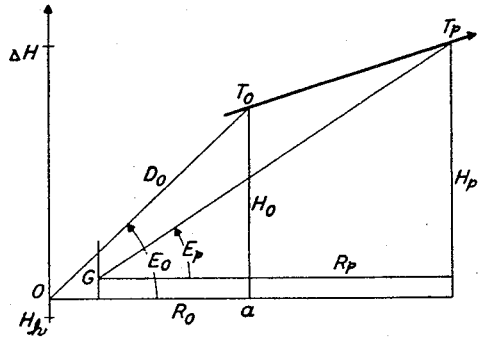

In Fig. 13c, O is the observation point, to the present position of the target, $a$ the vertical projection of the target on the horizontal plane, Eo the present elevation angle of the target, Ho the present height and Ro the present horizontal range of the target.

Then $$Ho = Do \sin Eo \qquad (4)$$

$$Ro = Do \cos Eo \qquad (5)$$

The output circuit of amplifier 302, Fig. 3, is connected to ground through connection 312, fourth set of break springs of relay 19, Fig. 1, resistor 20, and the lower portion of the winding 503 of potentiometer PT5.

The output circuit of amplifier 306, Fig. 3, is connected to ground through connection 313, first set of break springs of relay 19, Fig. 1, and the upper portion of the winding 503 of potentiometer PT5. An intermediate point in the winding 503 is grounded.

The potentiometer cards may be made by winding resistance wire closely and evenly on a strip of insulating material. One edge of this strip is straight and the wire crossing this edge is cleaned to make a good contact with the brush; the other edge of the strip is shaped so that the width of the strip will vary to produce the desired functional variation in the resistance of the winding. A single card, or a plurality of cards placed end to end, is wrapped around a light drum of suitable material, a continuous binding ring is placed round the card, or cards, and wedges inserted between the ring and card to press the card firmly to the drum. A plurality of drums of different diameters may be nested together and mounted on the outer portion of a suitable base, the potentiometer shaft may be journaled in a boss in the center of the base, and slip rings may be insulatingly mounted on the intermediate portion of the base, concentric with the shaft. Brush arms, carrying brushes in contact with the straight edges of the cards and connected to other brushes in contact with the corresponding slip rings, are mounted on the potentiometer shaft and may be driven directly by the shaft, or by gearing supported by the base and meshing with gears mounted on the shaft and brush arms.

In the circuit drawings, the cards of potentiometers which are automatically adjusted during the computations have been represented by circles surrounded by arcs indicating approximately the variations in the widths of the cards. Potentiometers which are preset for a given computation, or manually adjusted, are represented by straight cards, though these cards may also be formed into circles if desired. Each potentiometer has been given a PT number, e. g., PT23, and the associated cards numbered to correspond e. g., 2301, 2302 etc.

In the present computor, angles are measured in mils, where 6400 mils is one revolution.

The brushes of potentiometer PT5 are rotated by the elevation, or pointer, telescope, symbolically represented by the telescope 4 and associated gears. The card 503 extends over +1600 mils elevation and −200 mils depression, the grounded tap representing 0 mil or horizontal. The resistance of the resistor 20 and the lower portion of the winding is equal to the resistance of the upper portion of the winding.

The winding of card 503 has a sinusoidal variation of resistance and, as the voltage supplied to the upper end of the card, corresponding to 1600 mils, is proportional to −Do and the voltage supplied to resistor 20 is proportional to +Do, the voltage selected by the brush associated with card 503 is proportional to $Do(-\sin Eo)$ that is, to −Ho.

The brush associated with card 503 is connected through resistor 16, third pair of break springs of relay 19, connection 17 to the blade of switch 21.

When ranging with a height finder, the synchronous transmitter driven by the height shaft of the height finder is connected to the synchronous receiver 7, driving the inner dial 8. The motor 11, through the speed reducing device 23 drives the brush associated with card 801, PT8, and through suitable gears, represented by gears 24, 25, drives the middle dial 9.

A grounded source of positive potential 59 is connected to ground through resistor 26 and the winding of card 801. The brush of card 801 is connected through resistor 27 to the input circuit of amplifier 28, having a feedback resistor 31. The left-hand contact of switch 21 is connected through resistor 29 to the input circuit of amplifier 28, and a suitable meter 30 is connected across the output circuit of amplifier 28.

The operator adjusts the device 23 until the dial 9 tracks the dial 8, thus causing the brush of potentiometer PT8 to supply a voltage to the amplifier 28 proportional to +Ho. The operator then adjusts the device 12 until the meter 30 reads zero. The voltage supplied to resistor 29 is thus made proportional to −Ho, and, as the telescope 4 is tracking the target, the voltage selected by the brush of potentiometer PT6, will be proportional to −Do, the slant distance to the target.

In some cases, the height finder may not be at the same elevation as the reference point of the battery and a correction in height is required. A source of power 32, having an intermediate point grounded, has both poles connected to the contacts of a switch 33. The blade of switch 33 is connected to ground through resistor 34 and the winding of card 701, PT7. The brush of potentiometer PT7 is connected through resistor 35 to the input circuit of amplifier 28. The switch 33 is set to select a voltage of proper polarity, and the brush of potentiometer PT7 is adjusted to select a voltage of proper magnitude, which, when supplied to resistor 35 will correct for the difference in height.

*Altitude spot*

The brush of potentiometer PT7 may be adjusted to produce small arbitrary changes in the voltage supplied to the amplifier 28 which are equivalent to small changes in the voltage selected by the brush of potentiometer PT8.

When a height finder is not used, switch 21 may be placed on the right-hand contact, thus grounding connection 17 through resistor 22, which has a resistance equal to the resistance of resistor 29.

The output circuit of amplifier 306, Fig. 3, is connected by connection 313, break springs of first pile-up of relay 19, Fig. 1 to the junction of cards 501, 502, potentiometer PT5. The outer end of card 501 is grounded; and the outer end of card 502 is connected to ground through resistor 36. Card 501 extends over an arc of 1600 mils; card 502 extends over an arc of −200 mils; the resistance of card 502 and resistor 36 being equal to the resistance of card 501. The brush associated with cards 501, 502 is placed at a right angle with respect to the brush associated with card 503, and is moved by the movement of the telescope 4. The windings of cards 501, 502 have resistances varying with a cosinusoidal function, and, as the voltage supplied by amplifier 306, Fig. 3, is proportional to −Do, the voltage selected by the brush associated with cards 501, 502, Fig. 1, will be proportional to $Do(-\cos Eo)$, that is, to −Ro.

The brush associated with cards 501, 502 is connected through resistor 37, break springs of second pile-up of relay 19, connection 38, resistor 320, Fig. 3, to the input circuit of an amplifier 321, Fig. 3, having a feedback resistor 322. The output circuit of amplifier 321 is connected through resistor 323 with the input circuit of amplifier 324, having a feedback resistor 325.

The output circuit of amplifier 324 is connected by connection 326, break springs of second pile-up of relay 39, Fig. 1, to the upper junction of cards 401, 402, potentiometer PT4. The output circuit of amplifier 321, Fig. 3, is connected by connection 327, break springs of fourth pile-up of relay 39, Fig. 1, to the lower junction of cards 401, 402, PT4. Cards 401, 402 are arranged on the circumference of a circle.

As shown in Fig. 13A, the horizontal range Ro is resolved into the rectangular coordinates Xo, Yo, having their origin at O, the point of observation. For convenience, the Yo coordinate is in the north-south line, and the Xo coordinate is in the east-west line, the azimuth angle Ao being measured clockwise from north.
Then $$Xo = Ro \sin Ao \qquad (6)$$
$$Yo = Ro \cos Ao \qquad (7)$$

Distances east and north of the origin are positive, distances west and south of the origin are negative.

The brushes 40, 41, PT4, Fig. 1, are rotated by the azimuth telescope 3 through the azimuth angle Ao.

The resistances of cards 401, 402, PT4, Fig. 1, vary as a complete sinusoidal function and the windings are grounded at the point where the function is zero. With zero angle at the upper junction of cards 401, 402, brush 40 will select a voltage varying with cos Ao, and, as the voltage supplied to the upper junction of cards 401, 402 is proportional to −Ro, and the voltage supplied to the lower junction is proportional to +Ro, the voltage selected by brush 40 will be proportional to $Ro(-\cos Ao)$, that is, to −Yo. The brush 41 is displaced through a right angle with respect to brush 40 and thus will select a voltage proportional to $Ro(-\sin Ao)$, that is, to −Xo.

Brush 40 is connected through resistor 42 and the break springs of the third pile-up of relay 39 to connection 44; brush 41 is connected through resistor 43 and the break springs of the first pile-up of relay 39 to connection 45.

*Cloud switch*

In the present state of the art, the angles of azimuth and elevation may usually be measured more accurately by optical means than by radar; whereas, the slant distance may usually be measured more accurately by radar than by optical means. Thus, when both methods are available, the azimuth and elevation angles of a visible target are measured by optical means, and the slant distance by radar.

The radar apparatus is equipped with an azimuth potentiometer PT1, corresponding to the azimuth potentiometer PT4; and an elevation potentiometer PT2, corresponding to the elevation potentiometer PT6. The junctions of cards 101, 102 are connected to the make springs of the pile-ups of relay 39 to which the cards 401, 402 are connected; the brushes associated with cards 101, 102 are connected through resistors 48, 49 to the make springs of the pile-ups of relay 39 to which the brushes 40, 41 are connected; the junction of cards 201, 202 is connected to the make spring of the pile-up of relay 19 to which the junction of cards 501, 502 is connected and card 202 is grounded through resistor 50; the ends of card 203 are connected to the make springs of the pile-ups of relay 19 to which the ends of card 503 are connected, the smaller section through resistor 53; and the brushes associated with cards 201, 202 and with card 203 are respectively connected through resistors 51, 52 to the make springs of the pile-ups of relay 19 to which the brushes associated with cards 201, 202 and with card 203 are connected. The radar equipment follows the target in azimuth and elevation.

If the target should be obscured by a cloud or smoke screen, the fire control officer operates the cloud switch 46, connecting the grounded source of power 47 to ground through the windings of relays 19 and 39, operating relays 19 and 39.

The operation of relays 19 and 39 connects the potentiometers PT1 and PT2, in place of potentiometers PT4 and PT5, to connections 17, 44, 45 and the amplifiers of Fig. 3, thus supplying to the computing elements voltages controlled by the radar observations. When the target emerges from the smoke screen, the telescopes are trained and pointed at the target. Then the switch 46 may be opened, releasing relays 19 and 39, and supplying to the computing elements voltages controlled by optical observations.

The potentials with respect to ground of the connections 17, 44, 45 are respectively proportional to −Ho, −Yo and −Xo, the rectangular coordinates of the present position of the target with respect to the point of observation.

Connection 45 is connected through capacitor 403 and resistor 404 to the input circuit of amplifier 405. The output circuit of amplifier 405 is connected to the input circuit through series resistors 406, 407 and shunt resistor 408.

When a target is first placed under observation, switch 409 is placed on the left contact, closing a circuit from ground through switch 409, winding of relay 432, windings of similar relays for the Y and H coordinates (not shown), resistor 431 and source 430 to ground, operating all the relays.

The output circuit of amplifier 405 is thus connected through resistors 410, 411, 412, 413 and the make springs of the lower pile-up of relay 432 to the input circuit of amplifier 435. The output circuit of amplifier 435 is connected to the input circuit through series resistors 436, 437 and shunt resistor 438.

Capacitors 415, 416 are respectively connected to ground from the junctions of resistors 410, 411, and of resistors 412, 413; and capacitor 414 is bridged from the junction of resistors 410, 411 to the junction of resistors 412, 413. The junction of resistors 411, 412 is connected to ground through resistor 417, capacitor 418 and resistor 419.

The capacitor 403, resistor 404 and elements 410 to 419 are so proportioned that the output voltage of amplifier 435 is a smoothed first derivative $$-\dot{\bar{X}}$$

of the signal voltage −X weighted over a short time interval ending at the present interval, and is thus proportional to the target rate along this coordinate.

When a new target is placed under observation, an appreciable time is required for the observers to adjust the observing equipment to track the target smoothly and evenly. As the target usually is not capable of producing really abrupt changes in speed or course, any small abrupt irregularities in the voltages during this period may be assumed to be due to tracking errors, and may be smoothed. During this period, the observed data is not of the highest accuracy, and the data need not be weighted over a long period. Also, it is important that the guns should commence firing as soon as possible, even if the data is not of the highest accuracy. The network, including the elements 410 to 419, thus may have a comparatively short settling time, say of four to ten seconds, in which the output attains 99 per cent of its final value. As soon as this network has settled down and the output of amplifier 435 has reached a reasonably steady value, the guns may commence firing.

During this period, the output circuit of amplifier 405 is connected to ground through the network including elements 420 to 429, make springs of upper pile-up of relay 432 and resistor 433. As the network including elements 420 to 429 has the same configuration as the network including elements 410 to 419, a detailed description of the configuration is not necessary. The sum of the resistances of resistors 420, 421, 422, 423 is equal to the sum of the resistances of the resistors 410, 411, 412, 413, but the individual values of resistance and capacitance in this network are so proportioned that the network has a comparatively long settling time, say twenty to thirty seconds. During this first period, this network is charging up through resistor 433. For convenience, the network 410 to 419 will be termed the ten-second network, and the network 420 to 429 will be termed the twenty-second network.

After firing has continued for longer than the settling time of the twenty-second network, the switch 409 is operated, releasing relay 432 and the similar relays (not shown) for the Y and H coordinates. The twenty-second network is thus connected through the break springs of the upper pile-up of relay 432 to the input of amplifier 435 and the ten-second network is connected to ground through the break springs of the lower pile-up of relay 432 and resistor 433.

*Slewing*

If the observing instruments are rapidly turned, or slewed, as in picking up a new target, the apparent target rates along the coordinates will be high, tending to produce a large output voltage from amplifier 405, which will tend to charge the network capacitors to unduly high voltages. After the slew is completed, these charges must be dissipated before the output of amplifier 435 can fall to the correct value, and during this period of time, the output of amplifier 435 will be unreliable.

A slew key 54, Fig. 1, is provided for the radar operator, and similar keys 55, 56, 57 are provided for the optical observers. The keys 55, 56, 57 are wired through the break springs of the fifth pile-up of relay 19 so that, when the cloud switch 46 is operated, the slew keys 55, 56, 57 are cut off.

The slew keys 54, 55, 56, 57 when operated connect ground through connection 58, left contact and blade of switch 439, Fig. 4, winding of relay 440, and windings of similar relays (not shown) for the Y and H coordinates, resistor 431, source 430 to ground, operating relay 440 to connect one side of capacitor 403 through resistor 434 to ground, thus limiting the current supplied by capacitor 403 to amplifier 405 to a value which will not charge the network capacitors to unduly high voltages, yet at the same time, permitting the charge on capacitor 403 to rapidly vary with the variations in the potential of connection 45.

In some cases, inexperienced operators may forget to operate the slew keys, or the computer may be tested or operated with observing equipment not furnished with slewing keys. A relay 441 is connected to the output circuit of amplifier 405 and selected to have an operating voltage slightly higher than the normal maximum output voltage of amplifier 405. Switch 439 may be placed on the right-hand contact, thus, when the output voltage of amplifier 405 exceeds the normal maximum value, relay 441 will operate, operating relay 440, and the similar relays, to reduce the inputs to the smoothing networks.

Following a slew to a new target, the observations again will be unsteady, thus the ten-second network should be switched in until satisfactory tracking of the target is established. The networks may be automatically switched by the timer switch which includes a small motor 444 connected to a suitable power supply through the break springs of relay 443, and geared to a gear 445, carrying the angle arms 446, 447. The motor 444 exerts a torque on gear 445 to drive arm 446 against switch 448 against the tension of spring 450, thus keeping open switch 449. For automatic operation, switch 409 is placed on the right-hand contact.

The operation of relay 441, or one of the slew keys, completes a circuit from ground through connection 452, relay 443, resistor 442 and source 430 to ground operating relay 443. Relay 443 locks up over the circuit from ground, source 430, resistor 442, winding of relay 443, make springs of relay 443 and switch 449 to ground, opening the circuit of motor 444. Spring 450 retracts, drawing back arm 446 and operating switch 448 to complete a path through switch 409, operating relay 432, and similar relays, to switch in the ten-second networks. The spring 450 continues to retract, rotating the gear 445, arms 446, 447 and rotor of motor 444 until the arm 447 operates switch 449, opening the locking circuit of relay 443. If, at this time, relay 441, or one of the slew keys is still operated it will hold relay 443 operated and the arm 447 is held against switch 449. At the end of the slew, when relay 441, and the slew keys are all released, and when switch 449 has been operated, relay 443 will release, opening its locking circuit at its make springs, and completing the power circuit of motor 444 at its break springs. Motor 444 will start rotating gear 445, first moving arm 447 from spring 449, preparing the locking circuit for relay 443. Motor 444 continues to turn gear 445 until, after the lapse of the desired time interval of say 25 to 35 seconds, the arm 446 operates switch 448, releasing relay 432, and the similar relays, and switching in the twenty-second networks. If, during the rotation of gear 445, relay 441, or one of the slew keys is operated, operating relay 443, the timer switch will start a new cycle of operation.

Amplifiers, networks, and relays, such as relays 440, 441 and 432, similar to those shown for the —X coordinate channel are also provided for the —Y and —H coordinate channels. The capacitance of capacitor 403, and the resistances of resistors 404, 406, 407, 408, 420, 421, 422, 423, 436, 437, 438 are so chosen that the over-all gain of the system is proportional to the maximum time of flight $tm$, of the projectile. The brush of potentiometer 451, connected across the output of amplifier 435 may be adjusted to make the gain accurately proportional to $tm$.

*Target rate meter*

If the target is moving without acceleration, that is, in a straight line at constant speed, the target rates along the X, Y and H coordinates will be constant, and the voltages supplied to the connection 454, and to the corresponding connections 455, 456 will be constant.

Connection 454 is connected to ground through resistor 504, Fig. 5, and meter 505. The meter 505 is preferably a sensitive center zero meter, and indicates the target rate voltage. When the needle of meter 505 is steady, the target is moving along the coordinate with unaccelerated motion. If the needle of meter 505 is not steady, the target is accelerating, and, if the prediction in the computer is based upon unaccelerated motion, the prediction may be erroneous and the guns may have to stop firing.

A source of power 506, having an intermediate point grounded, is connected through resistors 507, 508 to the windings 1001, 1002 of adjustable resistor PT10. The windings on the cards 1001, 1002 do not cover the whole length of the cards, so that, when the cards are placed end to end to form a circle, the ends of the windings are separated by short lengths of insulation.

The brush of PT10 is adjusted so that the current from the brush will oppose and cancel part of the current to the meter 505, thus increasing the scale factor of the meter. For example, suppose the maximum target rate is 250 yards per second, and the full scale of meter 505 is graduated 50 yards per second. For rates from 0 to 50 yards, the brush of PT10 is on the central insulator. For rates from 50 to 100 yards, the brush of PT10 is adjusted to select a current of the proper polarity and magnitude to cancel a portion of the applied current proportional to 50 yards, so that, in effect, the meter 505 now reads from 50 to 100 yards per second.

Hand set rates

In some cases, the needle of meter 505 may oscillate irregularly above and below a mean value. It is improbable that such variations are due to accelerations and decelerations of the target, and it may be assumed that these variations are due to irregularities in tracking the target. These irregularities in tracking will not produce a very material error, if any, in the absolute magnitudes of the observed data, but they may produce large errors in the target rates, and thus produce large errors in the predictions based on the target rates.

The source 506 is connected through resistors 509, 510 to the winding of card 1101, potentiometer PT11. The brush of potentiometer PT11 is connected through resistor 511 to the input circuit of amplifier 512, having a feedback resistor 513. The output circuit of amplifier 512 is connected to one terminal of a center zero meter 515. Connection 454 is connected through resistor 514 to the other terminal of meter 515. The brush of potentiometer PT11 is adjusted until the needle of meter 515 oscillates evenly about zero. The output voltage of amplifier 512 is thus made equal to the mean value of the voltage from connection 454. Switch 516, which is normally on the left-hand contact, may then be moved to the right-hand contact, connecting the output circuit of amplifier 512 to the prediction circuits.

A target rate meter, such as meter 505, and the associated resistors, is provided for each of the three coordinates. Similarly, a hand set potentiometer, such as potentiometer PT11, and the associated amplifier 512 and meter 515, is provided for each of the three coordinates. If desired, either or both of these facilities may be installed in a weather-tight console and connected to the computer by a cable of sufficient length that the console may be installed at the position of the fire control officer.

In some cases, particularly in firing against surface targets or targets flying at constant height, it may be more convenient to set in the target speed and course, rather than the target rates along the X and Y coordinates.

The poles of a source of power 531, having an intermediate point grounded, are respectively connected to ground through the windings of cards 1301, 1302, potentiometer PT13. The brushes of PT13 are adjusted to select voltages of opposite polarities proportional to the estimated target speed and are connected to the junctions of cards 1201, 1202, potentiometer PT12. The windings of cards 1201, 1202 vary in resistance with a complete sinusoidal function, and are grounded at the points where the function passes through zero. The brushes of PT12 are mounted on the shaft at right angles to each other and are insulated from the shaft and each other. With north, or zero angle, at the upper junction of cards 1201, 1202 and clockwise rotation for increasing angle, these brushes are rotated to the course angle. The brush associated with card 1201 will thus select a voltage proportional to the estimated target rate along the X coordinate, and the brush associated with card 1202 a voltage proportional to the target rate along the Y coordinate.

Connection 454 is connected to one contact of switch 530, and to the junction of elements 517, 519. The brush associated with card 1201, PT12, is connected to the other contact of switch 530 and to the junction of elements 518, 520. Element 521 is connected to the junctions of elements 517, 519 and elements 518, 520. One coil 522, of a crossed coil ratio meter 529, is connected to the junctions of elements 517, 518 and of elements 519, 520.

Similarly, connection 455 is connected to one contact of switch 530, and to the junction of elements 523, 525. The brush associated with card 1202, PT12, is connected to the other contact of switch 530 and to the junction of elements 524, 526. Element 527 is connected to the junctions of elements 523, 525 and elements 524, 526. The other coil 528 of the meter 29 is connected to the junctions of elements 523, 524 and elements 525, 526.

Elements 517, 518, 519, 520 and 523, 524, 525, 526 are non-linear conductors and may be single copper-copper oxide couples. Elements 521, 527 may be double thallium-copper oxide couples, the couples being oppositely poled.

If the voltages supplied by the brushes of potentiometer PT12 are not equal to the voltages supplied by connections 454, 455, meter 529 will deflect. The brushes of potentiometers PT12 and PT13 are adjusted until meter 529 reads zero, or oscillates about zero. Switch 530, which is normally placed on the left-hand contacts may be moved to the right-hand contacts, cutting off the voltages from connections 454, 455 and substituting the hand set voltages from potentiometer PT12.

Connection 45, Figs. 1, 4, 5, 6, 7, supplies a current proportional to $-X_o$ through resistor 702 to the input circuit of amplifier 703, having a feedback resistor 704. A resistor 705 in series with a capacitor 706, is connected in shunt with resistor 704 and a capacitor 707 is connected in shunt with resistor 702. Resistor 705 and capacitors 706, 707 provide a moderate amount of weighted smoothing for the current supplied by connection 45 and for the output voltage of the amplifier.

Similarly, connection 44, Figs. 1, 4, 5, 6, 7, supplies a current proportional to $-Y_o$ through resistor 708 to the input circuit of amplifier 709, having a feedback resistor 710, and smoothing elements 711, 712, 713.

And connection 17, Figs. 1, 4, 5, 6, 7, supplies a current proportional to —Ho through resistor 714 to the input circuit of amplifier 715, having a feedback resistor 716 and smoothing elements 717, 718, 719.

The coordinates —Xo, —Yo and —Ho are measured with respect to the point of observation O, Figs. 13A, 13B, 13C, 13D, and must be combined with the gun parallaxes —Xg, —Yg, —Hg to give the coordinates with respect to the reference point of the battery G.

A source of power 720, having an intermediate point grounded, is connected to the contacts of a switch 721. The blade of switch 721 is connected to ground through resistor 722 and the winding of card 1501, potentiometer PT15. The brush of potentiometer PT15 is connected through resistor 723 to the input circuit of amplifier 703.

Switch 721 is set to select a voltage of proper sign, and the brush of potentiometer PT15 is adjusted to supply a current proportional to —Xg to the input circuit of amplifier 703.

Similarly, the source 724, switch 725, resistor 726 and potentiometer PT17 supply a current proportional to —Yg through resistor 727 to the input circuit of amplifier 709; and the source 728, switch 729, resistor 730 and potentiometer PT22 supply a current proportional to —Hg through resistor 731 to the input circuit of amplifier 715.

Because of the small delays produced by the smoothing networks 705, 706, 707 and 711, 712, 713 and 717, 718, 719, the overall gains of the networks of Fig. 4 are adjusted to be equal to the maximum time of flight plus these small delays.

Connections 454, 455, 456, Figs. 4, 5, 6, 7, 8, are respectively connected to ground through the winding of card 2301, potentiometer PT23 and resistor 802; through the winding of card 2302 and resistor 804; and through the winding of card 2303 and resistor 806. As will be described hereinafter, the brushes of potentiometer PT23 are rotated proportionally to the time of flight $t$ of the shell from the gun to the target. The brushes associated with cards 2301, 2302, 2303, potentiometer PT23 thus respectively select voltages proportional to $$-\bar{X}t, -\bar{Y}t \text{ and } -\bar{H}t$$

that is, to the changes —DX, —DY, —DH in the X, Y and H coordinates.

The brushes associated with cards 2301, 2302, 2303 potentiometer PT23 are respectively connected by connections 803, 805, 807 and resistors 732, 733, 734, Fig. 7, to the input circuits of amplifiers 703, 709, 715.

*Normal prediction*

The currents supplied to the input circuit of amplifier 703 are proportional to $$-Xo, -Xg, \bar{X}t$$

thus, the output voltage of amplifier 703 will be proportional to the predicted value +Xp of the X coordinate of the position of the target after the lapse of the time of flight $t$. Similarly, the output voltages of amplifiers 709, 715 will be proportional to +Yp and +Hp.

The smoothing networks shown in Fig. 4 have delays which are 40 per cent to 50 per cent of the settling times, thus the rates $$\bar{X}, \bar{Y}, \bar{H}$$

are smoothed values of the rates which existed a short time before the present time; for the ten-second network, the rate four or five seconds past and for the twenty-second network the rate eight or ten seconds past.

Thus, if the target should diverge from a straight line along a curved course, the normal prediction would be a linear prediction along the projection of a chord cutting the curve.

*Tangent prediction*

It may be shown that the delay of a network is proportional to the rate of change of the voltage applied to the network, thus, if current varying with the rates of change of the applied voltages are added to the currents from the networks of Fig. 4, the effects of the network delays are neutralized and the predictions become linear predictions along a straight line tangent to the course of the target at the point reached at the present instant.

The output circuit of amplifier 405 is connected by connection 454, Figs. 4, 5, 6, capacitor 602, resistors 603, 604, break springs of first pile-up of relay 605 to the input circuit of amplifier 606. The potential dividing resistors 607, 608 are connected across the output circuit of amplifier 606, and the feedback resistors 609, 610 are connected from the junction of resistors 607, 608 to the break spring of relay 605. A capacitor 611 is connected from the junction of resistors 603, 604 to ground, and a resistor 612, in series with a capacitor 613 is connected from the junction of resistors 609, 610 to ground. The resistors 603, 604, 609, 610, 612 and capacitors 611, 613 form a smoothing and weighting network, and may be proportioned to have a settling time of ten or twenty seconds.

When one of the slew keys of Fig. 1, or relay 441 of Fig. 4 is operated, a circuit is prepared from ground through connection 452, Figs. 4, 5, 6, winding of relay 605, resistor 614 to source 615, operating relay 605.

The operation of relay 605 connects one side of capacitor 602 through the make springs of the second pile-up of relay 605 and resistor 616 to ground; disconnects the junction of resistors 604, 610 from the input of amplifier 606 and connects this junction through the make springs of the third pile-up of relay 605, and resistor 616 to ground; and connects the junction of resistors 607, 608 through resistor 617 and the make springs of the first pile-up of relay 605 to the input circuit of amplifier 606. The charge on capacitor 602 thus can rapidly follow the input voltages during the slew without charging the smoothing capacitors to unduly high voltages.

The resistor 618 in series with capacitor 619 is connected to ground from the make spring of the first pile-up of relay 605 to reduce transients during switching. The relay 605 preferably is made slow releasing so that, at the end of a slew, the networks of Fig. 4 will be operative before the networks of Fig. 6 are switched in.

The source 615 is connected through the winding of relay 620 to the blade of switch 621; and through the winding of relay 622 to the blade of switch 623. Switches 621, 623 are four-position switches with the blades ganged to operate together. The second and fourth contacts of switch 621 and the third and fourth contacts of switch 622 are grounded.

For normal prediction, switches 621, 623 are on the first contact, and the output connection 625 is grounded through the break springs of the second pile-up of relay 622. The connections 626, 627 of the networks for the Y and H coordinates are similarly grounded.

For tangent prediction, switches 621, 623 are placed on their second contacts, completing a circuit from source 615 through the winding of relay 620, switch 621 to ground, operating relay 620, and the similar relays (not shown) for the Y and H coordinates.

The output circuit of amplifier 606 is thus connected through the make springs of the third pile-up of relay 620, the break springs of the third pile-up of relay 622, resistor 624 and connection 457 to the network of Fig. 4, thus adding to the output of amplifier 405 a current proportional to the rate of change of the output voltage of amplifier 435, compensating for the delay in the network.

The networks for the Y and H coordinates of Fig. 6 similarly supply currents over connections 455, 456 to the corresponding networks of Fig. 4.

*Curved course prediction*

The output circuit of amplifier 606 is connected to ground through resistor 655 and meter 656. A resistor 657 and a non-linear resistor 628, which may be a pair of oppositely poled copper-copper oxide couples, may be connected in series across the meter 656 to expand the lower part of the meter scale and compress the upper part. The meter 656 may conveniently have a mid-scale reading of $0.2g$, where $g$ is the acceleration due to gravity, and a full scale reading of $2g$.

The meter 656, and the corresponding meters for the Y and H coordinates, may conveniently be mounted near the target rate meters, such as meter 505, Fig. 6. If the reading of meter 505 is unsteady, this indicates that the target is accelerating, and, if, at the same time, the reading of meter 656 is steady, this indicates that the acceleration of the target is constant, and a prediction may be based upon the target acceleration.

The prediction for a target which is accelerating, which will be termed curved course prediction, may be based upon the expansion $$Xp = Xo + \dot{X}t + \tfrac{1}{2}\ddot{X}t^2 \qquad (8)$$

where $\dot{X}$ is the target rate, $\ddot{X}$ the target acceleration and $t$ is the time of flight of the shell.

The operators tracking the target rarely track with perfect smoothness, and these errors in tracking cause undesired perturbations in the values of Xo, Yo and Ho, which may pass through the differentiating amplifiers and cause the apparent values of $\ddot{X}$ to be larger than the true value due only to the target acceleration. In such cases, more accurate prediction may be given by reducing the apparent value of the acceleration and basing the prediction on the expansion $$Xp = Xo + \dot{X}t + \tfrac{1}{4}\ddot{X}t^2 \qquad (9)$$

The output circuit of amplifier 606 is connected through a resistor 629 to the input circuit of amplifier 630, having a feedback resistor 631. The output circuit of amplifier 630 is connected to the winding of relay 632.

It is generally found that second derivative prediction by Equations 8 or 9 is ineffective when the target acceleration is less than a minimum value $\ddot{X}m$ which depends upon the efficiency of tracking and is usually about $0.2g$. The resistances of resistors 629, 631 are so selected that relay 632 will operate when the output voltage of amplifier 606 exceeds this minimum value.

The operation of relay 632, or of a corresponding relay in the networks for the Y and H coordinates, completes a circuit from ground through the center contact and blade of switch 633, winding of relay 634 and source 615 to ground, operating relay 634.

Relay 634 may also be operated, independently of the relays, such as relay 632, by moving the blade of switch 633 to the grounded third contact.

The operation of relay 634 connects the output circuit of amplifier 606 to ground through the make springs of the lower pile-up of relay 634 and the winding of card 1401, potentiometer PT14; and connects the output circuits of the corresponding amplifiers for the Y and H coordinates, respectively, to ground through the make springs of the middle and upper pile-ups of relay 634 and the windings of cards 1402, 1403, potentiometer PT14.

As will be described hereinafter, the brushes of potentiometer PT14 are rotated proportionally to $t$, the time of flight of the shell, and the windings of cards 1401, 1402, 1403 vary in resistance such that the voltages selected by the brushes are proportional to $t^2$.

When the prediction is based upon Equation 9, switches 621, 623 are moved to their third contacts, completing a circuit from ground through the winding of relay 622, and the windings of the corresponding relays for the Y and H coordinates, source 615 to ground, operating relay 622.

The operation of relay 622 completes a circuit from the brush associated with card 1401, resistor 635, make springs of upper pile-up of relay 622, break springs of upper pile-up of relay 620, potential dividing resistors 638, 639 to ground; and connects the junction of resistors 638, 639, through the break springs of the middle pile-up of relay 620 and the make springs of the middle pile-up of relay 622 to connection 625, which is connected through resistor 735, Fig. 7, and supplies to the input circuit of amplifier 703 a voltage proportional to $\tfrac{1}{4}\ddot{X}t^2$ The output circuit of amplifier 606, Fig. 6, may also be connected through the make springs of the lower pile-up of relay 622 and resistor 624 to connection 454, to supply a current to compensate for the delay in the network of Fig. 4, if such compensation be found necessary.

The brushes associated with cards 1402, 1403, potentiometer PT14, Fig. 6, are similarly connected through resistors 636, 637 to the networks for the Y and H coordinates, which supply voltages proportional to $\tfrac{1}{4}\ddot{Y}t^2$ and $\tfrac{1}{4}\ddot{H}t^2$ through connections 626, 627 and resistors 736, 737, Fig. 7, to the input circuits of amplifiers 709, 715.

When the prediction is based upon Equation 8, switches 621, 623 are moved to their fourth contacts, completing circuits from ground through the windings of relays 620, 622, and the windings of the corresponding relays for the Y and H coordinates, source 615 to ground, operating the relays.

The brush associated with card 1401, PT14, is thus connected through resistor 635, make springs of upper pile-up of relay 622, and make springs of upper pile-up of relay 620 through resistor 640 to ground; and through make springs of second pile-up of relay 620 and make springs of second pile-up of relay 622 to connection 625, supplying to the input circuit of amplifier 703, Fig. 7, a voltage proportional to $$\tfrac{1}{2}\ddot{X}t^2$$

The brushes associated with cards 1402, 1403, PT14, Fig. 6, are similarly connected through resistors 636, 637, to the networks for the Y and H coordinates, to supply voltages proportional to $$\tfrac{1}{2}\ddot{Y}t^2 \text{ and } \tfrac{1}{2}\ddot{H}t^2$$

through connections 626, 627, to the input circuits of amplifiers 709, 715, Fig. 7.

The input circuit of amplifier 703 is supplied by connection 45 with a voltage proportional to $-Xo$; by connection 803 with a voltage proportional to $-\dot{X}t$; by connection 625 with a voltage proportional to $$-\tfrac{1}{4}\ddot{X}t^2$$

and by potentiometer PT15 with a voltage proportional to $-Xg$, thus, the output voltage of amplifier 703 is proportional to $+Xp$, a coordinate of the predicted position of the target with respect to the gun, or reference point of the battery.

Similarly, the amplifier 709 is supplied by connection 44 with a voltage proportional to $-Yo$; by connection 805 with a voltage proportional to $$-\dot{Y}t$$

by connection 626 with a voltage proportional to $$-\tfrac{1}{4}\ddot{Y}t^2$$

and by potentiometer PT17 with a voltage proportional to $-Yg$, thus, the output voltage of amplifier 709 is proportional to $+Yp$.

The amplifier 715 is supplied by connection 17 with a voltage proportional to $-Ho$; by connection 807 with a voltage proportional to $$-\dot{H}t$$

by connection 627 with a voltage proportional to $$-\tfrac{1}{4}\ddot{H}t^2$$

and by potentiometer PT22 with a voltage proportional to $-Hg$, and these voltages, together, are proportional to $-Hp$.

The output circuit of amplifier 715 is connected through resistor 787 to the input circuit of the polarity reversing amplifier 790, having a feedback resistor 788.

*Train or azimuth angle*

In Fig. 13B, G is the gun, or reference point of the battery, Tp is the projection on a horizontal plane of the predicted position of the target, having the coordinates $Yp=Ga$, and $Xp=ATp$. Due to the spin of the shell, and the wind, the shell will drift laterally during its flight, so that the gun must be trained to the point e, having the displacement D laterally to Gtp. The train, or azimuth angle of the gun, A will be the angle aGe. Draw ac parallel to Ge, ab and ce normal to Ge. Then $ab=Yp \sin A$; angle $aTpc=A$; $cTp=Xp \cos A$; $ce=ab=Xp \cos a-D$; thus, $$Xp \cos A - D - Yp \sin A = 0 \quad (10)$$

Also $$Gb = Yp \cos A; \ be=ac=Xp \sin A; \ Rf=Gb+be$$
$$Rf=Xp \sin A + Yp \cos A \quad (11)$$

The output circuit of amplifier 703, Fig. 7, is connected to the lower junction of cards 1603, 1604 potentiometer PT16 and through resistor 738 to the input circuit of polarity reversing amplifier 739, having a feedback resistor 740. The output circuit of amplifier 739 is connected to the upper junction of cards 1603, 1604. The windings of cards 1603, 1604 have resistances varying with a complete sinusoidal function, and are grounded at the points where the function passes through zero. The brushes associated with cards 1603, 1604 are located at right angles, driven by shaft 744, and are insulated from the shaft and each other. With north, or zero angle, at the upper junction of cards 1603, 1604, and clockwise rotation for increasing angle, the brush associated with card 1603 selects a voltage proportional to $-Xp \sin A$, and the brush associated with card 1604 selects a voltage proportional to $-Xp \cos A$.

The output circuit of amplifier 709 is connected to the lower junction of cards 1605, 1606, potentiometer PT16, and through resistor 741 to the input circuit of the polarity reversing amplifier 742, having a feedback resistor 743. The output circuit of amplifier 742 is connected to the upper junction of cards 1605, 1606. The windings of cards 1605, 1606 have resistances varying with a complete sinusoidal function, and are grounded at the points where the function passes through zero. The brushes associated with cards 1605, 1606, are located at right angles, are driven by shaft 744, and are insulated from the shaft and each other. With north, or zero angle, at the upper junction of cards 1605, 1606, and clockwise rotation for increasing angle, the upper brush will select a voltage proportional to $-Yp \cos A$, and the lower brush a voltage proportional to $+Yp \sin A$.

The brush associated with card 1604 is connected through resistor 749 to the input circuit of amplifier 754, having feedback resistors 745, 747, and supplies a voltage proportional to $-Xp \cos A$. The lower brush associated with card 1606 is connected through resistor 748 with the input circuit of amplifier 754 and supplies a voltage proportional to $+Yp \sin A$. As will be described hereinafter, voltages jointly proportional to $-D$ are supplied through resistors 750, 751 and a spotting voltage through resistor 752.

The output circuit of amplifier 754 is connected to the motor control circuit 756, of the type shown in Fig. 9, controlling motor 757.

In Fig. 9, a two-phase source of power 902 has one phase connected through transformer 903, amplifier 904 and transformer 905 to one phase winding of the motor. The other phase is connected through transformer 906, bridge formed by elements 907, 908, 909, 910, transformer 915, amplifying tubes 917, 918 and transformer 920 to the other phase winding of the motor.

The elements 907, 908, 909, 910 may conveniently be copper-copper oxide couples, selected so as to form a normally balanced bridge. When the copper plate is about ½ volt, or more, positive with respect to the oxide, these elements have a resistance of less than 60 ohms; when the copper plate is about ½ volt, or more, negative with respect to the oxide, these elements have a resistance of 50,000 ohms or more; for voltages between ½ volt and —½ volt the resistance decreases exponentially. In the drawings, the arrow heads indicate the directions of flow of the biasing currents to make the resistances of the elements low.

The output circuit of the motor control summing amplifier, such as amplifier 754, Fig. 7, is connected to ground through the winding of card 3001, potentiometer PT30. The brush of PT30 is connected through resistor 921 and inductor 922 to a mid-tap in the secondary winding of transformer 906. Shunt capacitors 923, 924, with resistor 921 and inductor 922 form a low pass filter. The mid-point of the secondary winding of transformer 915 is grounded.

If the voltage from the source 902 makes positive the upper end of the secondary winding of transformer 906, a current will tend to flow through resistor 907, down through the winding of transformer 915, and resistor 908, and another current will tend to flow through resistor 909, up through the winding of transformer 915 and resistor 910. In the absence of a voltage supplied to potentiometer PT30, the elements 907, 908, 909, 910 have substantially the same resistance, thus the opposing currents in the winding of transformer 915 will be substantially equal, and the current supplied to the motor winding it is not sufficient to cause the motor to creep.

If a positive voltage is supplied to potentiometer PT30, current will flow through resistor 921 and inductor 922 to the tap in the winding of transformer 906, through the upper portion of the winding of transformer 906, element 907 and upper portion of the winding of transformer 915 to ground; and through the lower portion of the winding of transformer 906, element 908 and the lower portion of the winding of transformer 915 to ground, reducing the resistances of the elements 907, 908. When the voltage from the source 902 makes positive the upper end of the winding of transformer 906, the alternating current flowing down through the winding of transformer 915 will be larger than the alternating current up through the winding and the motor will run in one direction.

If a negative voltage is supplied to potentiometer PT30, current will flow from ground through the upper section of the winding of transformer 915, element 910 and the lower section of the winding of transformer 906 and through the lower section of the winding of transformer 915, element 909 and the upper section of the winding of transformer 906, thence through inductor 922 and resistor 921 to potentiometer PT30, reducing the resistance of the elements 909, 910. When the voltage from source 902 makes positive the upper end of the winding of transformer 906, the alternating current flowing up through the winding of transformer 915 will be larger than the current down through the winding and the motor will run in the opposite direction.

The output voltage of amplifier 754, Fig. 7, is proportional to $Xp \cos A - Yp \sin A - D$, and, by Equation 10 this quantity should equal zero. If the output voltage is not zero, the difference voltage is supplied to the control circuit 756, of the type shown in Fig. 9, which drives motor 757 to vary the values of $\cos A$ and $\sin A$ to make the difference voltage equal zero. The shaft 744 is thus rotated by the motor 757 to the train or azimuth angle A, which may be indicated on a suitable dial 758, and transmitted to the guns by a suitable data transmission system. The resistor 746 and capacitor 753 shunted across the feedback path of amplifier 754 stabilize the operation of motor 757 and reduce hunting of the motor.

The brush associated with card 1603, PT16, is connected by connection 777, through resistor 817, Fig. 8, to the input circuit of an amplifier 822, having a feedback resistor 823, and supplies a voltage proportional to $-Xp \sin A$. The upper brush associated with card 1606, PT16, Fig. 7, is connected by connection 778, through resistor 818, Fig. 8, to the input circuit of amplifier 822, and supplies a voltage proportional to $-Yp \cos A$. The voltages supplied to amplifier 822 are proportional to $-Xp \sin A - Yp \cos A$, which, from Equation 11 are proportional to $-Rf$.

Ballistic corrections

The values of the normal trajectory of the shell, as tabulated in the firing tables, are based on normal interior ballistics, that is, a gun having a standard muzzle velocity; normal exterior ballistics, that is, air of standard density or a standard ballistic coefficient; and the absence of wind and drift.

The corrections for non-standard conditions are tabulated in the firing tables and may be expressed as horizontal and vertical distances in the plane of the line of fire, and distances normal to this plane.

The predicted position Tp of the projection of the target is given by the coordinates Xp, Yp, Fig. 13B, from which the predicted horizontal range Rp can be obtained. The predicted position of the target Tp, Fig. 13D, can then be obtained from Rp and the predicted height Hp. For normal ballistics, these values, when combined with the superaltitude, will give the position of the virtual target T.

Figure 13D:
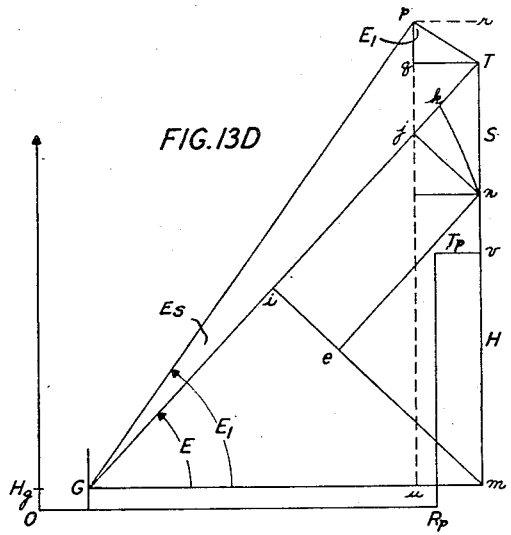

When abnormal ballistic conditions are present, the values for the geometrical predicted position of the target are modified to give the coordinates of what may be termed a ballistic predicted position. In Fig. 13D, the horizontal corrections Tpv have been added to Rp to give the firing range R; and the vertical corrections vn have been added to Hp to give the height H, which, combined with the superaltitude nT, gives the location of the virtual target T. In Fig. 13B, the lateral corrections D have been combined with Xp and Yp to give the train, or azimuth angle of fire A, and the location T of the projection of the virtual position at the horizontal range R.

Wind

The wind may have two effects on the shell (1) increase or decrease the shell velocity, (2) deflect the shell. These effects are known as the range wind and cross wind effects. The range wind will tend to cause the shell to burst behind, or ahead, of the point where the shell would burst in calm air, and, since the shell is usually not traveling horizontally, will lower or raise the point of burst. The linear displacements produced will depend upon the velocity of the wind, and the time of flight of the shell.

In Fig. 13B, the wind has a displacement W at a bearing Aw. Then the cross wind displacement will be $W \sin (A - Aw)$ and the range wind displacement $W \cos (A - Aw)$.

Generally, the meteorological service regularly supplies data on the velocity and bearing of a ballistic wind, which is an average of the actual winds at different elevations, weighted in accordance with their effect on a shell fired at a horizontal target. When the gun is actually firing at an elevated target, this ballistic wind should be modified proportionally to the height of the target to appropriately modify the weighting factor.

The output circuit of amplifier 715, Fig. 7, is connected by connection 759, Figs. 7 and 8, through resistor 67 to the brush of the potentiometer PT25. A grounded source of voltage 65 has its negative pole connected through resistor 66 to the brush of potentiometer PT25. The winding of card 2501, PT25 is grounded at one end, and the other end is connected to ground through the winding of card 2304, PT23. The brush of potentiometer PT25 is adjusted to supply a current to the winding of card 2304, PT23, proportional to the velocity of the ballistic wind, as modified by the current from amplifier 715, Fig. 7.

As described hereinafter, the brush associated with card 2304, PT23, Fig. 8, is moved proportionally to the time of flight of the shell and supplies a voltage proportional to the wind displacement W through resistor 761, Fig. 7, to the input circuit of amplifier 762, having a feedback resistor 763. The output circuit of amplifier 762 is connected to the upper junction of cards 1601, 1602, PT16, and, through resistor 764 to the input circuit of amplifier 765, having a feedback resistor 766. The output circuit of amplifier 765 is connected to the lower junction of cards 1601, 1602.

The windings of cards 1601, 1602, PT16 have a resistance varying with a complete sinusoidal function and are grounded at the points where the function passes through zero.

The shaft 744 is connected through a differential gear 767 to the shaft 768 driving the brushes associated with card 1601. The ring gear of differential gear 767 is geared to a handwheel 769. The handwheel 769 is set to the bearing Aw of the wind, as shown by the dial 770, thus, the brushes associated with card 1601 are rotated proportionally to A—Aw.

The upper and lower brushes associated with card 1601 respectively select voltages proportional to the cross and range winds, and are connected to ground through the potential dividing resistors 771, 772 and 773, 774.

The junction of resistors 771, 772 is connected by connection 775 to ground through resistor 809, Fig. 8, and through resistor 808, winding of card 2601, PT26 and resistor 813.

The brush associated with card 2601 is rotated proportionally to E to select a voltage proportional to the deflection effect of the cross wind and is connected by connection 814, through resistor 750, Fig. 7, to the input circuit of amplifier 754.

The junction of resistors 773, 774 is connected by connection 776 to ground through resistor 810, Fig. 8, through resistor 811, winding of card 2602, potentiometer PT26, and resistor 815 and is connected through resistor 812 to the brush associated with card 2603, PT26. The ends of the winding of card 2603 are grounded. The brushes associated with cards 2602 and 2603, PT26, are rotated proportionally to E and respectively select voltages proportional to the range and height effects of the range wind.

The brush associated with card 2602, PT26, is connected through resistor 816 to the input circuit of amplifier 822.

The brush associated with card 2603, PT26 is connected by connection 824, through resistor 779, Fig. 7, to the input circuit of amplifier 715.

Muzzle velocity

The initial, or muzzle, velocity of the shell decreases with the wear of the gun bore due to the erosive effect of the gases from the propellant. A new gun may be designed to have a muzzle velocity somewhat higher than the standard used in the firing tables for normal ballistics, but, with continued use of the gun, the muzzle velocity will decrease to standard and to substandard. The guns of a battery are preferably selected so as to have about the same muzzle velocities, and an average value is used for the battery.

A substandard muzzle velocity tends to cause the shell to burst short, and below, the point where a shell fired with standard velocity would burst. The effect of substandard muzzle velocity upon the horizontal range and height of burst may be derived from the corrections tabulated in the firing tables. The magnitude of these corrections depends upon the time of flight of the shell and the quadrant elevation, and an analysis of these corrective functions of time of flight and elevation shows that the functions may be resolved into two rather simple functions, one part being proportional to a constant, and the other part being proportional to the height of the target. In some cases, this second function may be further divided into a function dependent upon the height of the target and a function dependent upon the horizontal range of the target.

The output circuits of amplifiers 715, 790, Fig. 7, are respectively connected by connections 759, 760, to the contacts of switch 839, Fig. 8. The poles of a source of power 838, having an intermediate point grounded, are connected to the contacts of switch 840. The blades of switches 839, 840 are ganged together and placed on the upper contacts when the muzzle velocity is above standard and on the lower contacts when the muzzle velocity is substandard.

The blade of switch 839 is connected through resistor 843 to the brush associated with card 2701, potentiometer PT27; through resistors 843, 851 to the brush associated with card 2605, PT26; through resistor 846 to the brush associated with card 2702, PT27; and through resistors 845, 852 to the brush associated with card 2606, PT26. The blade of switch 840 is connected through resistor 844 to the brush associated with card 2701, PT27 and through resistor 846 with the brush associated with card 2702, PT27. The brushes associated with cards 2605, 2606, PT26 are respectively connected to ground through the windings of cards 2701, 2702, PT27. The brushes of potentiometer PT27 are adjusted to the value of the muzzle velocity, and as described hereinafter, the brushes associated with cards 2605, 2606, PT26 are moved proportionally to the quadrant elevation.

The upper end, corresponding to a quadrant elevation of 1600 mils, of the winding of card 2605, PT26 is grounded, and the lower end, corresponding to a quadrant elevation of about —200 mils, is connected to ground through the winding of card 2305, PT23. The brush associated with card 2305, PT23 is moved proportionally to the time of flight of the shell and is connected through resistor 819 to the input circuit of amplifier 822.

The lower end of card 2606, PT26, is grounded and the upper end is connected to ground through the winding of card 2306, PT23. The brush associated with card 2306, PT23, is connected by connection 855, through resistor 781, Fig. 7, to the input circuit of amplifier 715. Resistor 782 and capacitor 783, connected in serial relationship across resistor 781 smooth the currents supplied to amplifier 715.

Air density

The correction for non-standard air density, or ballistic coefficient, is closely similar to the correction for non-standard muzzle velocity.

The connections 759, 760 are connected to the contacts of switch 841 and the poles of source 838 are connected to the contacts of switch 842. The blades of switches 841, 842 are ganged and are placed on the upper contacts for air density over the standard and on the lower contacts for air density below the standard.

The blade of switch 841 is connected through resistor 847 to the brush associated with card 2801, potentiometer PT28; through resistors 847, 853 with the brush associated with card 2607, PT26; through resistor 849 to the brush associated with card 2802, PT28; and through resistors 849, 854 with the brush associated with card 2608, PT26. The blade of switch 842 is respectively connected through resistors 848, 850 to the brushes associated with cards 2801, 2802, PT28. The brushes associated with cards 2607, 2608, PT26 are respectively connected to ground through the windings of cards 2801, 2802, PT28. The brushes of potentiometer PT28 are adjusted to the value of the air density.

The upper end of the winding of card 2607, PT26 is grounded, and the lower end of the winding is connected to ground through the winding of card 2307, PT23. The brush associated with card 2307, PT23, is connected through resistor 820 to the input circuit of amplifier 822.

The input circuit of amplifier 822 has thus been supplied with voltages proportional to the predicted horizontal range, and the ballistic corrections, thus, the output voltage will be proportional to $+R$, the horizontal range for the ballistic computations. The output circuit of amplifier 822 is connected through resistor 857 to the input circuit of the polarity reversing amplifier 858, having a feedback resistor 859.

The lower end of the winding of card 2608, PT26 is grounded and the upper end of the winding is connected to ground through the winding of card 2308, PT23. The brush associated with card 2308, PT 23, is connected by connection 856, through resistor 784, Fig. 7, to the input circuit of amplifier 715. Resistor 785 and capacitor 786 connected in series across resistor 784 smooth the currents supplied to amplifier 715.

The input circuit of amplifier 715 has thus been supplied with voltages proportional to the predicted height of the target, and the ballistic corrections, thus, the output voltage of amplifier 715 will be proportional to $+H$, the height for the ballistic computations.

Drift

The drift, or lateral displacement of the shell due to the spin of the shell will be proportional to the horizontal range, and will be a function of the time the shell is affected by this condition, that is the time of flight.

The output circuit of amplifier 822 is connected to ground through resistor 860, winding of card 2312, potentiometer PT23 and resistor 861. The brush associated with card 2312, PT23, is connected by connection 862, through resistor 751, Fig. 7, to the input circuit of amplifier 754.

Azimuth spot

A small angular change DA in the azimuth angle A will produce a lateral change $\pm R$ sin $DA$. The output circuits of amplifiers 822, 858, Fig. 8, are connected to the contacts of switch 863. The blade of switch 863 is connected to ground through connection 864, resistor 755 and the winding of card 2001, potentiometer PT20. The winding of card 2001, PT20, may have a sinusoidal variation of resistance, though, as the angle is small, the variation may be linear. The brush of potentiometer PT20 is adjusted to the value of DA, and is connected through resistor 752 to the input circuit of the amplifier 754.

Ballistics

Let $R$ = horizontal range to the vertical projection of a point on the trajectory of the shell
$H$ = height of this point
$t$ = time of flight of shell to this point
$E$ = quadrant elevation of the gun
$V$ = initial velocity of shell along the trajectory
$g$ = acceleration due to gravity.

In a vacuum, without air friction, $$R = Vt \cos E$$
$$H = Vt \sin E - \tfrac{1}{2} g t^2$$

Let $F = Vt$, the virtual slant range, and $S = \tfrac{1}{2} g t^2$ the superaltitude, then, $$R = F \cos E$$
$$H = F \sin E - S$$

In Fig. 13D, the gun is at G, the virtual target at T, the horizontal range R is $Gm$; the height H is $nm$; the virtual slant range F is GT and the superaltitude S is $Tn$. Draw $im$ and $jn$ normal to GT and $in$ parallel to GT. Angle $TGm$ = angle $Tmi$ = angle $Tnj$ = $E$. The triangles $Tnj$ and $TGm$ are similar and in the ratio S to F, thus $jT$ may be divided at $k$ to make $$jk = \frac{S}{F}(H)$$

and $$kT = \left(\frac{S}{F}\right) S$$

$$im = R \sin E = (H+S) \cos E$$
$$GT = Gi + iT = R \cos E + (H+S) \sin E = F$$
$$R \cos E + H \sin E = F - S \sin E$$
$$-R \sin E + H \cos E = -S \cos E$$

But $$\sin E = \frac{M+S}{F} = \frac{H}{F} + \frac{S}{F}$$

and $$\cos E = \frac{R}{F}$$

$$R \cos E + H \sin E = F - H\left(\frac{S}{F}\right) - S\left(\frac{S}{F}\right)$$

$$-R \sin E + H \cos E = -R\left(\frac{S}{F}\right)$$

collecting terms $$R \cos E + H\left(\sin E + \frac{S}{F}\right) = F\left[1 - \left(\frac{S}{F}\right)^2\right]$$

$$-R\left[\sin E - \left(\frac{S}{F}\right)\right] + H \cos E = 0$$

In Fig. 13D, $R \cos E = Gi$; $H \sin E = ij$;

$$H\left(\frac{S}{F}\right) = jk$$

$$F = GT$$

$$S\left(\frac{S}{F}\right) = kT$$

$$R \sin E = im$$

$$R\left(\frac{S}{F}\right) = il$$

and $$H \cos E = lm$$

Substituting for F and S $$R \cos E + H\left[\sin E + \frac{gt}{2V}\right] = Vt\left[1 - \frac{(gt)^2}{(2V)^2}\right]$$

$$-R\left[\sin E - \frac{gt}{2V}\right] + H \cos E = 0$$

These equations are for vacuum ballistics, and may be generalized to account for air friction into $$R \cos E + H[\sin E + q(t)] = b(t) \quad (12)$$
$$-R[\sin E - q(t)] + H \cos E = 0 \quad (13)$$

In many cases, a closer match to the values tabulated in the firing tables may be obtained if Equations 12 and 13 are modified to $$m(t) R \cos E + H \sin E + q(t) H = b(t) \quad (14)$$
$$-R \sin E + p(t) R + s(t) H \cos E = 0 \quad (15)$$

in which $m(t)$ and $s(t)$ are functions of $t$, somewhat less than unity, and $p(t)$ and $q(t)$ are also functions of $t$.

In some cases, it may be found that the function $m(t)$ as derived from the firing tables results in an undesirable shape of potentiometer card. This may be avoided by deriving the function $m(t) - m(tm)$, where $m(tm)$ is the value of $m$ for the maximum time of flight, as this function usually results in a more desirable shape of card. This function may then be combined with $+m(tm)$ to give $m(t) - m(tm) + m(tm)$. A similar change is made in the function $s(t)$.

The function $q(t)$ as derived from the firing tables may also, for some guns, result in an undesirable card shape. In this case, a more desirable shape may be derived if a factor $kHb(t)$, where $k$ is a numerical fraction, is added to both sides of Equation 14.

The modified equations thus become $$R \cos E(m(t) - m(tm) + m(tm)) + H$$
$$\sin E + H(q(t) + kb(t)) - (1+kH) b(t) = 0 \quad (16)$$

$$-R \sin E + p(t) R + H[(s(t) -$$
$$s(tm)) + s(tm)] \cos E = 0 \quad (17)$$

The output circuit of amplifier 858 is connected to the junction of cards 2609, 2610, potentiometer PT26. The other end of card 2609, PT26, is grounded, and the other end of card 2610, PT26 is grounded through resistor 865. The windings of cards 2609, 2610 vary in resistance with a cosinusoidal function, and the brush associated with card 2610, PT26, is connected through resistor 866 to the input circuit of amplifier 867, having a feedback resistor 868, to supply a voltage proportional to $-R \cos E$.

The output circuit of amplifier 867 is connected to ground through resistor 869 and the winding of card 2309, PT23; and through the potential dividing resistors 871, 870. The brush associated with card 2309, PT23 is connected through resistor 830 to the input circuit of a motor summing amplifier 835, having feedback resistors 827, 834, and supplies a voltage proportional to $$+R \cos E(m(t) - m(tm))$$

As this quantity evidently becomes zero for maximum time of flight, when $t = tm$, the upper end of the winding of card 2309, PT23 is grounded.

The junction of resistors 871, 870 is connected through resistor 831 to the input of amplifier 835, and supplies a voltage proportional to $+R \cos Em(tm)$.

The output circuits of amplifiers 715, 790, Fig. 7, are respectively connected by connections 759, 760, through resistors 872, 873, Fig. 8, to the ends of the winding of card 2604, PT26. The winding of card 2604, PT26, varies in resistance with a sinusoidal function and is grounded at the point where the function passes through zero. The brush associated with card 2604, PT26, is connected through resistor 832 to the input circuit of amplifier 835 and supplies a voltage proportional to $+H \sin E$.

The output circuit of amplifier 715, Fig. 7, is connected by connection 759 to ground through resistor 874, Fig. 8, the winding of card 2314, PT23, and resistor 875. The brush associated with card 2314, PT23 is connected through resistor 829 to the input circuit of amplifier 835 and supplies a voltage proportional to $$+H(q(t) + kb(t))$$

The output circuit of amplifier 790, Fig. 7, is connected by connection 760 to ground through resistor 876, Fig. 8, winding of cards 2315, PT23 and resistor 877. A grounded source of power 878 has its negative pole connected through resistor 879 to the end of the winding of card 2315, PT23. The brush associated with card 2315, PT23 is connected through resistor 828 to the input circuit of amplifier 835 and supplies a voltage proportional to $-(1+kH) b(t)$.

The output circuit of amplifier 835 is connected to a control circuit 836, of the type shown in Fig. 9, controlling a motor 837, driving a shaft 880 moving all the brushes of potentiometer PT23. The resistor 826 and capacitor 825 connected to ground from the junction of resistors 827, 834 stabilize the motion of the motor 837.

The voltages supplied to amplifier 835 are proportional to $R \cos E(m(t) - m(tm)) + R \cos Em(tm) + H \sin E + H(q(t) + kb(t)) = (1+kH) b(t)$ and, from Equation 16, the output voltage of amplifier 835 should equal zero. If the output voltage of amplifier 835 is not zero, motor 837 will start, driving the brushes of potentiometer PT23, changing the value of $t$ until the output voltage is reduced to zero and the brushes have moved to the correct value of $t$, which may be indicated, as by a dial 881.

The brush associated with card 2315, potentiometer PT23 is connected by connection 641, Figs. 8, 7, 6, through resistor 642 to the input circuit of amplifier 643, having feedback resistors 644, 645, and supplies a voltage proportional to $-(1+kH) b(t)$.

The output circuit of amplifier 715, Fig. 7, is connected by connection 759 to ground through resistor 651 and the winding of card 1404, potentiometer PT14. The winding of card 1404, PT14, like the winding of card 2315, PT23, Fig. 8, varies in resistance with the function $b(t)$. A grounded source of power 649, Fig. 6, has its positive pole connected to ground through resistor 650 and the winding of card 1404, PT14. The brush associated with card 1404, PT14, is connected through resistor 648 to the input circuit of amplifier 643. The output circuit of amplifier 643 is connected to a control circuit 653, of the type shown in Fig. 9, controlling a motor 652, driving the brushes of potentiometer PT14. Capacitor 646 and resistor 647 connected to ground from the junction of resistors 644, 645 stabilize the motion of motor 652. The voltage supplied by connection 641 is proportional to $-(1+kH)b(t)$; and the voltage supplied by the brush associated with card 1404, PT14 is of the form $+(1+kH)b(t)$. If the output voltage of amplifier 643 is not equal to zero, motor 652 moves the brushes of potentiometer PT14 until the voltage is zero and the brushes have been moved to the value of $t$, the time of flight of the shell.

The output circuit of amplifier 858 is connected through resistor 821 to one end of the winding of card 2613, PT26; and the output circuit of amplifier 822 is connected through resistor 85 and resistor 882 to the other end of the winding. The winding of card 2613, PT26, has a sinusoidal variation of resistance, and is grounded where the function passes through zero. The brush associated with card 2613, PT26, is connected through resistor 888 with the input circuit of an amplifier 890, having feedback resistors 886, 883, and supplies a voltage proportional to $-R \sin E$.

The output circuit of amplifier 822 is connected to ground through resistor 895, the winding of card 2311, PT23 and resistor 896. The brush associated with card 2311, PT23 is connected through resistor 887 to the input circuit of amplifier 890, and the winding of card 2311, PT23 has a variation in resistance such that the voltage supplied by the brush is proportional to $+p(t)R$.

The output circuit of amplifier 790, Fig. 7, is connected by connection 760, to ground through resistor 897 and the winding of card 2310, PT23 and through the potential dividing resistors 898, 899. The brush associated with card 2310, PT23 is connected through resistor 80 to the input circuit of an amplifier 81, having a feedback resistor 83, and the resistance of the winding of card 2310, PT23 has a variation in resistance such that the voltage supplied by the brush is proportional to $-H(s(t)-s(tm))$. The junction of resistors 898, 899 is connected through resistor 82 to the input circuit of amplifier 81 and supplies a voltage proportional to $-Hs(tm)$.

The output circuit of amplifier 81 is connected to ground through the winding of card 2611, PT26 and through the winding of card 2612, PT26 and resistor 84. The windings of cards 2611, 2612, PT26 have a cosinusoidal variation of resistance, and the brush associated with card 2612, PT26 is connected through resistor 889 to the input of amplifier 890 to supply a voltage proportional to $+H[(s(t)-s(tm))+s(tm)] \cos E$.

The output circuit of amplifier 890 is connected to a control circuit 891, of the type shown in Fig. 9, controlling motor 894, driving shaft 893 moving all the brushes of potentiometer PT26. The resistor 885 and capacitor 884 connected to ground from the junction of resistors 886, 883, assists in stabilizing the motion of motor 892. The voltages suppled to amplifier 890 are proportional to $-R \sin E + p(t)R + H[(s(t)$
$-s(tm))+s(tm)] \cos E$ and from Equation 17, the output voltage of amplifier 890 should be zero. If the output voltage is not zero, motor 892 drives shaft 893 moving the brushes of potentiometer PT26 until the output voltage of amplifier 890 is reduced to zero and the brushes of potentiometer PT26 have moved to the value of the quadrant elevation E, which may be indicated as by dial 894, and transmitted by the usual data transmission system (not shown) to the guns.

*Elevation spot*

The elevation spot should produce an angular change $Es$ in the quadrant elevation $E$ which should not affect the computed values of azimuth angle or time of flight.

As shown by Equation 16, the time of flight involves a rather complicated equation, thus, as a first approximation, instead of the time of flight, the slant range to the virtual target may be assumed to remain constant. In Fig. 13D, when the quadrant elevation E is increased by the elevation spot Es to the value El, the slant range D is unchanged, that is, $GT=Gp$.

The shift of the virtual target from T to $p$ will increase the height by $pq=DH$, and decrease the horizontal range by $um=qT=DR$. As Es is a small angle $pT=GT \sin Es$, angle $qpT=El$, thus $qT=DR=GT \sin Es \sin El$ and $pq=DH=GT \sin Es \cos El$.

But $GT \sin El=H+DH+S$ and $GT \cos El=R-DR$, hence $DR=(H+DH+S) \sin Es$ and $DH=(R-DR) \sin Es$. As DR and DH are small, $DR=(H+DH) \sin Es$ and $DH=R \sin Es$.

The output circuits of amplifiers 715, 790, Fig. 7, are respectively connected by connections 759, 760 to the blades of the double pole double throw switch 86. One contact of switch 86 is connected to ground through resistor 68 and the winding of card 2403, potentiometer PT24 while the other contact is connected to ground through resistor 92 and the winding of card 2404, PT24. The brush associated with card 2403, PT24 is connected to ground through resistor 93, connection 95 and the winding of card 2613, PT26; the brush associated with card 2404, PT24 is connected to ground through resistor 94, connection 96, resistor 882 and the winding of card 2613, PT26. The windings of cards 2403, 2404, PT24 may vary with a sinusoidal function, but, as Es is a small angle, $\sin Es=Es$, thus, these windings may have a linear variation. For a positive spot, switch 86 is placed on the left-hand contacts, and for a negative spot, on the right-hand contacts.

The output circuits of amplifiers 822, 858 are respectively connected to the contacts of switch 87; and the blade of switch 87 is connected to ground through resistor 88 and the winding of card 2402, potentiometer PT24. The winding of card 2402, like the winding of card 2403, may have a sinusoidal or linear variation in resistance. When the spot increases the quadrant elevation, the blade of switch 87 is placed on the left contact; when it decreases the elevation, the blade is placed on the right contact. The brush associated with card 2402, PT24 is connected by connection 91 through resistor 779, Fig. 7, to supply the spot voltage to amplifier 715.

The output circuits of amplifiers 715, 790, Fig. 7, are respectively connected by connections 759, 760 to the contacts of switch 89, Fig. 8. The blade of switch 89 is connected to ground by resistor 90 and the winding of card 2401, potentiometer PT24. The brush associated with card 2401, PT24 is connected through resistor 833 to the input circuit of amplifier 835. The variation in resistance of the winding of card 2401, PT24 could be determined by analysis of Equations 16 and 17, but the relationship is quite involved, and the variation may be more easily determined by empirical methods. The card 2401, and brush, are temporarily replaced by a simple potentiometer and meter, the brushes of potentiometer PT24 are adjusted for various values of the elevation spot, the temporary potentiometer adjusted to keep the output voltage of amplifier 835 unchanged and, from the resultant meter readings, the required variation in resistance may be determined.

Fuze number

A grounded source of power 97, Fig. 8, has its positive pole connected to ground through the winding of card 2313, potentiometer PT23, and resistor 98. The winding of card 2313, PT23 has a linear variation of resistance, and the brush associated therewith is connected by connection 238, through resistor 99, Fig. 7, to the input circuit of an amplifier 230, having feedback resistors 791, 794, and supplies to amplifier 230 a voltage proportional to $t$, the time of flight of the shell.

The fuze number is a function of the time of flight, but, after the fuze is cut, the gun must be loaded and fired, thus, the fuze number required is a function of what the time of flight probably will be after the lapse of the dead time required to cut the fuze, load and fire. The time of flight, $t$, at the present time is, therefore, extrapolated, by the relationship $$tf = t + \tfrac{1}{2} \dot{t} t d$$

where $tf$=time of flight for fuze number, $\dot{i}$=rate of change of $t$ and $td$=dead time.

Connection 238 is connected through resistor 798 and capacitor 797 to the brush of potentiometer PT21. The winding of card 2101, PT21 is connected through resistor 796 to the input circuit of amplifier 230, and through resistor 799 to ground. The brush of potentiometer PT21 is adjusted to the value, $td$, of the dead time and supplies a voltage proportional to $$\dot{i} td$$

to amplifier 230.

A grounded source of power 235 has its negative pole connected to ground through the winding of an adjustable resistor PT19, resistor 236, winding of card 1801, potentiometer PT18 and resistor 237. The winding of card 1801, PT18 varies in resistance with the function relating fuze number and time of flight as given in the firing tables for the gun used. The brush associated with card 1801, PT18 is connected to ground through resistor 234, and through resistor 795 to the input circuit of amplifier 230.

The output circuit of amplifier 230 is connected to a control circuit 231, of the type shown in Fig. 9, controlling a motor 232, driving the brushes of PT18. A capacitor 792 and resistor 793 connected to ground from the junction of resistors 791, 794 stabilizes the motion of motor 232. If the output voltage of amplifier 230 is not equal to zero, motor 232 moves the brush of potentiometer PT18 to make the voltage equal zero. The brush has thus been moved to the fuze number, which may be indicated, as by dial 233, and sent by suitable transmission system (not shown) to the guns.

Fuze spot

When the brush associated with card 1901, PT19 is moved, the resistance in series with card 1801, PT18 is changed, thus changing the voltage supplied by the brush of potentiometer PT18. The change produced is proportional to the value of the fuze number, thus, resistor PT19 may have a scale graduated in percentage of the fuze number.

Gain compensation

If a servomotor system is to follow changing values quickly and accurately, the over-all power gain of the system should be slightly less than the combined electrical and mechanical losses. If the net loss is too great, the system will be sluggish in response, while if there is a net gain, the system will tend to oscillate, or hunt.

A potentiometer, such as PT30, Fig. 9, is connected between the output circuit of the summing amplifier and the control circuit for each servomotor to adjust the net gain to a desirable value. This adjustment will not remain constant over the operating range, unless the voltage change in the output circuit of the motor summing amplifier for a given angular displacement of the servomotor potentiometer brushes is constant. In the fuze servomotor, this ratio is constant; but, in the azimuth and elevation angle servomotors, and, to some extent, in the time of flight servomotors, the ratio will vary with R, or H, or both.

In Equation 10, in the solution of any given problem, D will be a constant, thus, the equation to be solved is $$Xp \cos A = Yp \sin A = 0$$

Let $e$=the output voltage of the motor summing amplifier for an error $a$ in the angle A.

$$Xp \cos (A+a) - Yp \sin (A+a) = e$$

But, $Xp \cos A - Yp \sin A = 0$ and $Xp \sin A + Yp$
$$\sin A + Yp \cos A) = e$$

But, $Xp \cos A - Yp \sin A = O$ and $Xp \sin A + Yp \cos A = R$, and, as $a$ is small, $\sin a = a$, thus $$\frac{e}{a} = -R$$

that is, the output voltage per degree error increases with the horizontal range R. By a similar, but more complicated analysis, it may be shown that the sensitivity of the quadrant elevation and time of flight servomotor systems varies as a function of slant range, and may be controlled by voltages proportional to R and H.

The output circuit of amplifier 858, Fig. 8, is connected by connection 925 to the motor control circuit 756, Fig. 7, controlling the azimuth servomotor 757.

Connection 925, Fig. 9, is connected to the junction of a pair of non-linear resistors 911, 912, which may be copper-copper oxide couples, bridged across the connection between transformers 906 and 915. A grounded source of power 914 is connected to a tap in the winding of transformer 915, and, through adjustable resistor 913 to the junction of resistors 911, 912. Resistor 913 is adjusted so that, in the absence of a voltage supplied by connection 925, the biasing current makes resistor 911, 912 of high resistance. The current from connection 925 reduces the resistances of resistors 911, 912, thus producing an increasing loss between transformers 906 and 915 and keeping the sensitivity constant.

In a similar manner, voltages from the H amplifier 790, Fig. 7, or the R amplifier 858, Fig. 8, or both, may be supplied to the control circuits of motors 837, 892, Fig. 8.

Plotting boards

When a shell fails to burst on the target, the error may be due to a number of causes such as inaccurate tracking of the target; inaccurate or irregular determination of the target rates due to the target being obscured by fog, smoke, screens, etc., inaccurate estimation of the ballistic corrections; or evasive action by the target resulting in a more or less curved course. From observation only of the burst of the shell, it is very difficult to determine which one of these causes resulted in a miss. For convenience in determining the cause of a miss, the computer may be associated with plotting boards which continuously plot the present and predicted future positions of the target in the horizontal and vertical planes. The plotted courses will indicate inaccuracies in tracking and form a valuable check upon the efficiencies of the trackers also, if the plotted results indicate irregular errors in prediction due to inaccurate determinations of target rates, the operators can resort to handset rates. But, if the plotted results are accurate and the shell fails to burst on the target, this indicates that some of the ballistic corrections are inaccurate and aid the personnel in deciding what spot corrections should be made. The plotted courses of the target will also indicate when the target is taking evasive action and the type of course the target is pursuing, and thus enable the personnel to decide what type of prediction will be most effective.

Horizontal or XY board

Figure 15:
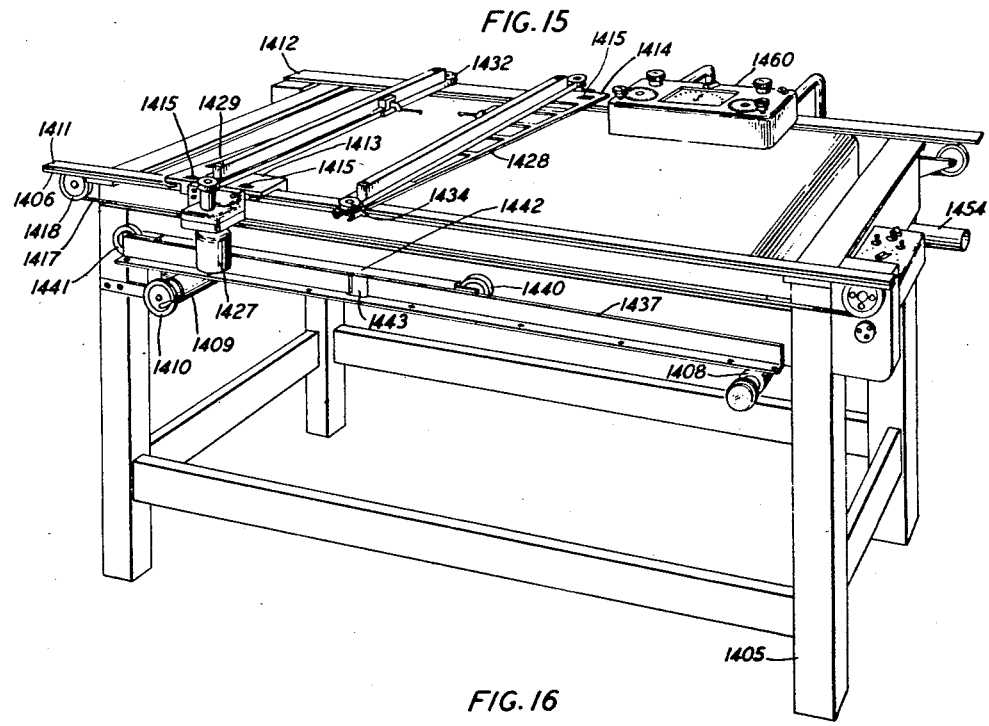
Fig. 15 is a perspective view of the horizontal board.
Figure 16:
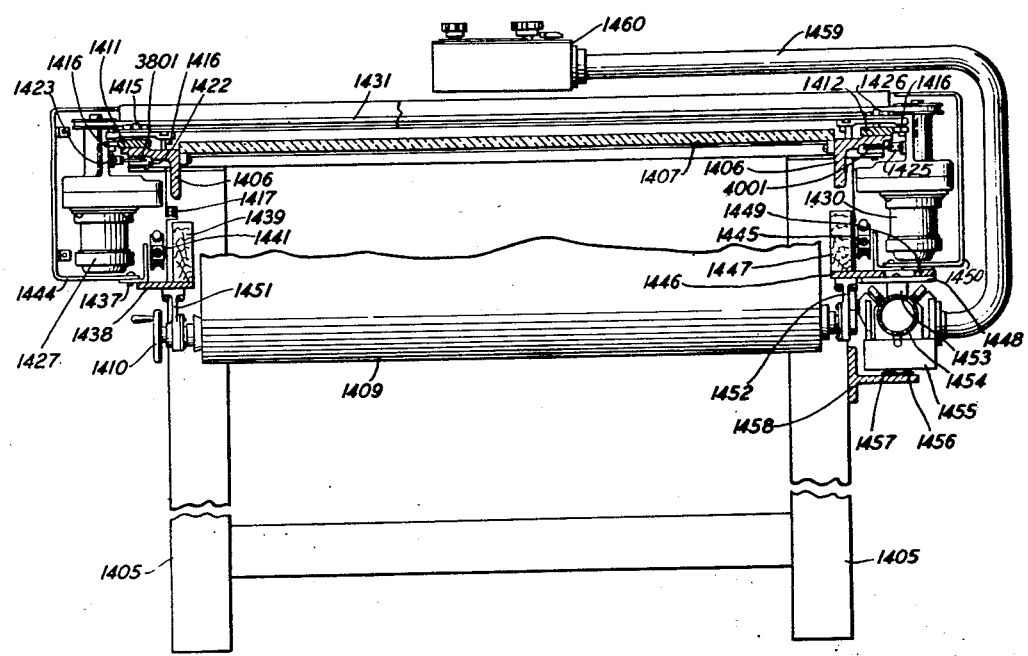
Fig. 16 is a view in part section along the line 16—16 of Fig. 14.

The horizontal board plots the projections on the horizontal plane through the reference point of the battery of the present and predicted positions of the target. As shown in Figs. 14, 15, 16, the plotting board may conveniently be in the form of a large table, having legs 1405, suitably braced, and a framework 1406, supporting a glass top 1407. A sheet of plotting paper is stretched over the glass top 1407 from the roll 1408 to the roll 1409, and may be stretched or rolled up by the handwheel 1410. A pair of rails 1411, 1412, machined flat on the top and sides, are mounted on the framework 1406, along each side of the board. A pair of pen arm carriages 1413, 1414 are supported as by rollers 1415, 1415 riding on the tops of the rails 1411, 1412 and are guided, as by rollers 1416, 1416 bearing on the sides of the rails 1411, 1412.

Figure 11:
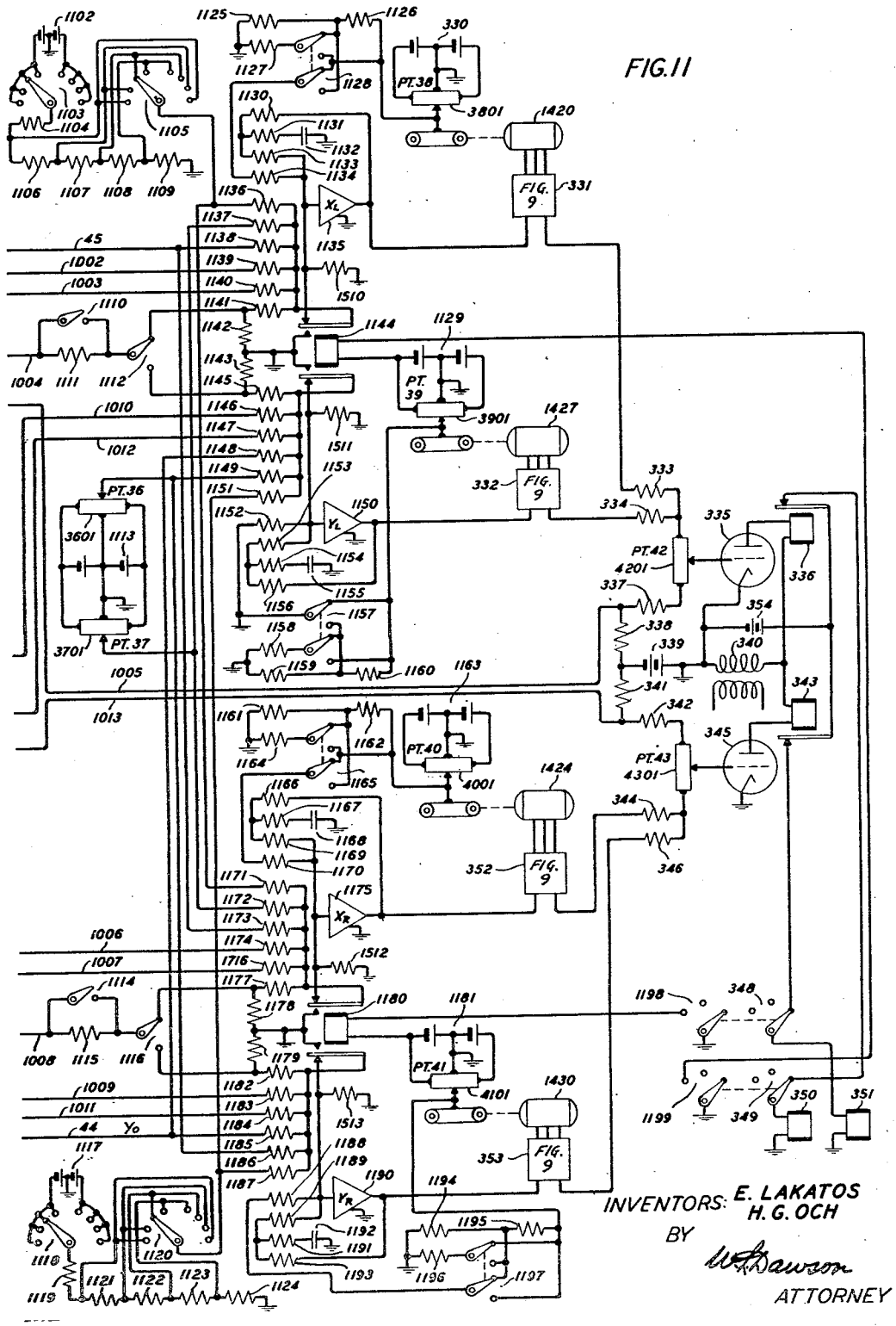

A thin metallic tape 1417 has both ends affixed to the carriage 1413 and is threaded over a pulley 1418, at one end of the board, and over the driving pulley of motor 1420, Figs. 11 and 14, mounted on the other end of the board. The rotation of the pulley of motor 1420 thus will draw the carriage 1413 along the rail 1411.

Similarly, the tape 1419 is affixed to the carriage 1414 and threaded over the pulley 1421 and the driving pulley of motor 1424, Figs. 11 and 14, to draw carriage 1414 along rail 1412.

A straight card 3801, PT38, Figs. 11 and 16, is mounted under the edge of the framework 1406 and held in place by clips 1422 attached to the framework. A brush 1423, insulatingly mounted on the carriage 1413, is in contact with the winding of card 3801. Card 4001, potentiometer PT40, Figs. 11 and 16, is similarly mounted under the edge of the framework on the other side of the board and is in contact with brush 1425 insulatingly mounted on the carriage 1414.

A light metal strip 1438, Fig. 16, is attached to the rail 1439 and supports a light angle 1437. A pair of pulleys 1440, 1441, spaced by a bar 1442 are free to move in the angle 1437. The wiring associated with motor 1427 is connected into two cables, respectively threaded over the pulleys 1440, 1441 and through the opening 1443, thus, when the motor 1427 and carriage 1413 are moved, the cables draw the pulleys 1440, 1441 and bar 1442 along in the angle 1437, thus preventing the cables from becoming tangled. A light metal cover 1444, supported by the angle 1437 protects the moving parts from contact with the clothing of the operators. A similar bar and pulleys, indicated by the pulley 1445, Fig. 16, are provided at the rear of the board for the cables from motor 1430.

A bar 1446 is secured to the rail 1447 and welded to a cross bar 1448 supporting a second bar 1449. A light cover 1450 is secured to the bar 1446.

Castings 1451, 1452, attached to the bars 1438, 1446 carry the journals of the roll 1409. Similar castings (not shown) carry the journals of the roll 1408.

A pipe 1454, running the length of the board, is welded to spacers 1453 welded to the cross bar 1448. A casting 1455, formed with stiffening webs and two upstanding arms, carry rollers bearing on the upper surface of the pipe 1454. A projection on the casting 1455 projects between the guide rails 1456, 1457. The guide rails 1456, 1457 are supported by a T bar 1458 attached to the legs 1405. Pipes 1459, 1459, suitably formed are attached to the casting 1455 and carry a control box 1460 in which are mounted switches for controlling the computer. The control box 1460 may be manually traversed above the plotting surface to the most convenient place.

The light triangular pen carriage arms 1428, 1429 are respectively mounted on the carriages 1414, 1413, extend across the plotting surface and are supported at the outer ends by rollers, such as roller 1426, Fig. 16, rolling on the rails 1411, 1412.

The motor 1427, Figs. 11 and 16, supported by the carriage 1413, drives the thin metallic tape 1431, extending along the arm 1429, around pulley 1432, journaled in the arm 1428, and the pulley of motor 1427. Similarly motor 1430 is supported by carriage 1414 and drives the tape 1433 around pulley 1434 and the pulley of motor 1430. The tapes 1431, 1433 slide the pen carriages 1435, 1436 along the arms 1429, 1428.

The motor 1420 drives the left-hand pen carriage arm in the X coordinate and may conveniently be designated as the $X_L$ motor. The motor 1427 drives the left-hand pen carriage in the Y coordinate and may conveniently be designated as the $Y_L$ motor. Similarly, the motors 1424 and 1430 may be designated as the $X_R$ and $Y_R$ motors. The motor control amplifiers shown in Fig. 11 are similarly designated.

The pens, pen carriages, potentiometer cards and brushes are shown most clearly in Figs. 17, 18, 19.

An L-shaped bar 1803 is mounted on the arm 1428. A bar 1804, abutting against spacing thimbles 1805, is screwed to one face of the bar 1803. Card 4101, potentiometer PT41, Figs. 11, 18, interleaved between two strips of insulation, is placed against the bar 1804 and retained by the strip 1806, which is held in place by clamps 1807 and screws 1808. The winding of card 4101 is connected by suitable wires to the computing circuit.

A conductive bar 1809 is spaced from the other face of bar 1803 by the insulating thimbles 1812 and secured by screws passing through bar 1803 but insulated therefrom. Mounted on the bar 1809 is a conductive carriage 1813, to which is attached a brush 1811 in contact with the winding of card 4101, and a second brush 1810 in contact with the bar 1809, and exerting enough pressure to hold the carriage 1813 firmly on the bar 1809. The tape 1433, Figs. 14 and 18, is clamped to the carriage 1813 by insulated clamps 1814, so that the brush 1811 is moved by the tape 1433 along the winding of card 4101. The carriage 1813 and brushes are protected by a light metal cover 1815 supported on the bar 1803.

A rail 1816, machined on the sides, is mounted on spacer 1817 attached to the arm 1428. A pen carriage 1818, machined to a sliding fit, is mounted on the rail 1816. Mounted on the carriage 1818 is a base 1819 having two upturned ears 1820, 1821 between which are mounted two straight permanent magnets 1822, 1823 and the coil of the electromagnet 351, Figs. 11, 17, 18, 19.

One end of the tape 1433 is secured to a clamp 1825, affixed to the L-shaped member 1824 mounted on the base 1819; the other end of the tape 1433 is secured to a clamp 1826 affixed to the strip 1827 which is secured to a bar 1828 by screws 1829 passing through slotted holes in the strip 1827, thus permitting the tape 1433 to be tightened. The bar 1828 passes through holes in the L-shaped members 1830, 1824 affixed to the base 1819. A spring 1831 is attached to the bar 1828 by a pin 1832, and passes through a hole in the base 1819, thus applying spring tension to the tape 1433.

As shown in Fig. 19, a V-shaped notch is cut in the vertical wall of the member 1824. One end of the bar 1833 is turned down to form a pin resting in this notch. The other end of the bar 1833 is drilled and tapped. A slot is cut in the vertical wall of the member 1830, and the reduced shank of a screw 1834, screwed in the member 1833, rests in this slot. A magnetic armature 1835 is attached to the bar 1833, and, by turning screw 1834 to displace bar 1833, the armature 1835 may be aligned with the magnets 1822, 1823.

A U-shaped member 1836, having open bearings cut in the outstanding ears, is attached to the bar 1833. A movable body 1837, has a solid pivot at the upper end engaging the bearing in the member 1836. At the lower end, the body 1837 is drilled and tapped to secure a small pipe 1838 engaging the lower bearing in the member 1836 and dipping into the ink reservoir 1839, which is supported by a spring clip 1840 attached to the carriage 1818. The body 1837 is also drilled and tapped to secure a capillary pen 1841, the drill hole for the pen 1841 opening into the hole for the pipe 1838, so that ink from the reservoir is supplied to the pen 1841.

A flat strip of metal 1843 is wrapped around a pin 1842, secured in the bar 1833, and rests against the rear surface of the body 1837. A spring 1844, resting against the rear inner surface of the member 1836, is coiled round the pin 1842 and presses the strip 1943 against the body 1837. The rear surface of the body 1837 is so shaped that, when the pen 1841 is laterally displaced, turning the body 1937, and then released, the pressure of the strip 1843 will drive the body 1837 and pen 1841 back to a central position. The thin sheet stops 1845 attached to the body 1837 limit the maximum rotation of the body by coming in contact with the armature 1835. A wedge-shaped piece 1846 may be attached to the outer end of the pen 1841, so that, if the two pens collide, they will slide past each other.

The permanent magnets 1822, 1823 are of such strength that the armature 1835 is attracted, pivoting the pen 1841 and support 1836 around the pivots of the bar 1833 and raising the pen from the surface. When the electromagnet 351 is energized, the field of the electromagnet 351 neutralizes the field of the permanent magnets, permitting the pen 1841 to drop down on the plotting surface.

One end of the winding of electromagnet 351 is grounded to the carriage 1818; the other end is connected to the brush 1847, insulatingly mounted on the base 1819. The brush 1847 is in contact with a bar 1848 insulatingly mounted on the cover 1815; and the bar 1848 is connected to the switch 348, Fig. 11.

As the present position of the projection of the target is continuously plotted on the plotting board, the operator can visually project the target's course forward a distance proportional to the distance traveled by the target during the time of flight of the shell and compare this projected position with the predicted future position being plotted by the other pen. If the predicted position does not agree with the visually projected position, the position of the target is not being correctly predicted. Some of the control switches and potentiometers may conveniently be installed near the operator so that corrections in the predictions may easily be made. As a general rule, the computer and plotting boards are located in a fire control center near the guns, but the observing equipment may be some distance away.

The slow switches and altitude converter switches of Fig. 1 are installed on the observing equipment; the cloud switch may conveniently be a pendant switch on the end of a separate cable stretched to some point from which the fire control officer can observe the target; the spot correction potentiometers and switches are installed on the computer; the automatic slow switch 439, Fig. 4, is installed on the computer; the data smoothing network switch 409, Fig. 4, may be installed in control box 1460, Fig. 14; the target rate meter 505 and potentiometer PT10, Fig. 5, may be mounted on the computer, or in a small console cabled to the position of the fire control officer; the null meter 515, switch 516, and rate potentiometer PT11, one for each coordinate may be installed on the computer; the null meter 529, switch 530, target speed potentiometer PT13 and target course potentiometer PT12 may be installed in the control box 1460, Fig. 14; the prediction control switches 621, 623 and 633 may be mounted in the control box 1460, Fig. 14; the pen interchange switch 1016, Fig. 10, and the map square parallax switches 1103, 1105 and 1118, 1120 may be mounted in the control box 1460, Fig. 14; the manual marking switches 1019, 1025, Fig. 10, are mounted in the console for the fire control officer; the automatic marking switches 1021, 1028, Fig. 10, with a snap switch to start motor 2002 are installed in a small control box 1470, Fig. 14, mounted on the end of the plotting board; switches 1112, 1116, Fig. 11, may be ganged together and mounted in control box 1460, Fig. 14; switches 1128, 1157, 1165, 1197, 1110, 1114, Fig. 11, are ganged together and mounted in control box 1470, Fig. 14; switches 1198, 348 and 1199, 349, Fig. 11, are also mounted in control box 1470, Fig. 14, with snap switches to control the power supply to the computing circuits.

When the course of the target, as plotted, moves from left to right, the left pen plots the present position and the right pen the predicted position; whereas, when the course, as plotted, moves from right to left, the left pen plots the predicted position and the right pen the present position. Thus, it is necessary to interchange the functions of the pens by switching the connections supplying the voltages representing the prediction from the control of one pen to the control of the other pen.

The connections 45, 625, 803 and 44, 626, 805, Fig. 7, are cabled to the plotting board control circuit, Fig. 10.

Connection 45 is connected through resistor 1138, Fig. 11, to the input circuit of amplifier 1135, having feedback resistors 1130, 1133 and through resistor 1173 to the input circuit of amplifier 1175, having feedback resistors 1168, 1169 and supplies voltages proportional to Xo, a coordinate of the present position of the target; connection 44 is connected through resistor 1148 to the input circuit of amplifier 1150, having feedback resistors 1156, 1153 and through resistor 1185 to the input circuit of amplifier 1190, having feedback resistors 1193, 1189 and supplies voltages proportional to Yo, another coordinate of the present position of the target.

A grounded source of voltage 1113 has its poles connected to the ends of the windings of cards 3601, potentiometer PT36 and card 3701, potentiometer PT37. The brush of potentiometer PT36 is connected through resistor 1149 to the input circuit of amplifier 1150 and through resistor 1186 to the input circuit of amplifier 1190 and is adjusted to supply voltages proportional to Yg, a parallax of the gun, or reference point of the battery with respect to the point of observation. Similarly, the brush of potentiometer PT37 is connected through resistor 1137 to the input circuit of amplifier 1135, and through resistor 1172 to the input circuit of amplifier 1175 and is adjusted to supply voltages proportional to Xg, another parallax.

Connection 803 is normally connected through the break springs of the third pile-up of relay 1015, Fig. 10, connection 1006, and resistor 1174, Fig. 11, to the input circuit of amplifier 1175; connection 625 is normally connected through the break springs of the fifth pile-up of relay 1015, Fig. 10, connection 1007 and resistor 1176, Fig. 11, to the input circuit of amplifier 1175, supplying voltages proportional to the first and second derivative predictions of the change DX in the X coordinate.

Similarly, connection 626 is normally connected through the break springs of the eighth pile-up of relay 1015, Fig. 10, connection 1009 and resistor 1183, Fig. 11, to the input circuit of amplifier 1190; and connection 805 is normally connected through the break springs of the tenth pile-up of relay 1015, Fig. 10, connection 1011 and resistor 1184, Fig. 11, to the input circuit of amplifier 1190, supplying voltages proportional to the first and second derivative predictions of the change DY.

Resistors 1139, 1140 are connected to the input circuit of amplifier 1135, resistors 1146, 1147 are connected to the input circuit of amplifier 1150, and these resistors are respectively connected to ground through connections 1002, 1003, 1010, 1012 and the break springs of the second, fourth, ninth and eleventh pile-ups of relay 1015, Fig. 10.

A grounded source of power 1014 is connected through the winding of relay 1015 to the blade of switch 1016, having a grounded contact.

The operation of switch 1016 operates relay 1015, grounding connections 1006, 1007, 1009, 1011 at the make springs of the third, fifth, eighth and tenth pile-ups of relay 1015; and respectively connecting connections 803, 625, 626, 805, through the make springs of the second, fourth, ninth and eleventh pile-ups of relay 1015 to connections 1002, 1003, 1010, 1012, thus cutting off the prediction voltages form amplifiers 1175, 1190, Fig. 11, and supplying them to amplifiers 1135, 1150.

The output circuit of amplifier 1135 is connected to the control circuit 331, of the type shown in Fig. 9, controlling motor 1420. A source of power 330 has an intermediate point grounded and the poles connected to the ends of the winding of card 3801, potentiometer PT38. The brush of potentiometer PT38 is connected through the lower contacts of switch 1128 and resistor 1134 to the input circuit of amplifier 1135. The voltages supplied to the input circuit of amplifier 1135 are proportional to a coordinate of the position of the target, and, if the output voltage of amplifier 1135 is not equal to zero, motor 1420 will start, driving the brush of potentiometer PT38 until the output voltage has been reduced to zero and the brush of potentiometer PT38 has been moved a distance proportional to the coordinate. Resistor 1131 and capacitor 1132 stabilize the motion of the motor 1420.

Similarly, the output circuit of amplifier 1150 is connected to a control circuit 332, of the type shown in Fig. 9, controlling motor 1427 driving the brush of potentiometer PT39, which is connected through switch 1157 and resistor 1152 to the input circuit of amplifier 1150. A grounded source of power 1129 is connected across the winding of card 3901, PT39. If the output voltage of amplifier 1150 is not equal to zero, motor 1427 drives the brush of potentiometer PT39 to make the output voltage equal to zero, thus moving the brush a distance proportional to a coordinate of the position of the target. Resistor 1154 and capacitor 1155 stabilize the motion of the motor 1427.

The output circuit of amplifier 1175 is connected to a control circuit 352, of the type shown in Fig. 9, controlling motor 1424 driving the brush of potentiometer PT40, which is connected through switch 1165 and resistor 1170 to the input circuit of amplifier 1175. A grounded source of power 1163 is connected across the winding of card 4001, PT40. If the output voltage of amplifier 1175 is not equal to zero, motor 1424 drives the brush of potentiometer PT40 to make the output voltage equal to zero, thus moving the brush a distance proportional to the coordinate of the position of the target. Resistor 1167 and capacitor 1168 stabilize the motion of the motor 1424.

The output circuit of amplifier 1190 is connected to a control circuit 353, of the type shown in Fig. 9, controlling motor 1430, driving the brush of potentiometer PT41, which is connected through switch 1197 and resistor 1188 to the input circuit of amplifier 1190. A grounded source of power 1181 is connected across the winding of card 4101, potentiometer PT41. If the output voltage of amplifier 1190 is not equal to zero, motor 1430 will drive the brush of potentiometer PT40 to make the output voltage equal to zero, thus moving the brush a distance proportional to the coordinate of the position of the target. Resistor 1191 and capacitor 1192 stabilize the motion of the motor 1430.

The plotting board may conveniently be arranged so that the nominal origin of the plotted coordinates is in the center of the board. Thus, when the voltages supplied to the amplifiers are reduced to ground potential, the pens should be driven to the center of the board. To test this condition, the coordinate voltages are reduced to zero, and the input circuit is connected to ground potential, driving the pens to a position of rest, and the pens are then adjusted to be accurately on the center of the board.

The input resistors 1136 to 1141 are connected to the input circuit of amplifier 1135 through the upper break springs of relay 1144; and, similarly, the input resistors 1145 to 1151 are connected to the input circuit of amplifier 1150 through the lower break springs of relay 1144. The grounded source 1120 is connected through the winding of relay 1144 to the first contact of switch 1199. When switch 1199 is placed on the first contact, relay 1144 is operated, cutting off the coordinate voltages from the input circuits of amplifiers 1135, 1150, causing motors 1420, 1427 to drive the left pen to the center of the board, and grounding the input resistors so that the operation of the computer is not affected. Resistors 1510, 1511 are respectively connected from the input circuits of amplifiers 1135, 1150 to ground, to supply ground potential to the amplifiers.

Similarly, the input resistors 1171 to 1177 and 1182 to 1187 are connected through the springs of relay 1180 to the input circuits of amplifiers 1175, 1190. Relay 1180 may be operated over a circuit from source 1181, winding of relay 1180, first contact and blade of switch 1199 to ground, cutting off the coordinate voltages from amplifiers 1175, 1190, and grounding the input resistors, causing motors 1424, 1430 to drive the right pen to the center of the board. Resistors 1512, 1513 are respectively connected from the input circuits of amplifiers 1175, 1190 to ground, to supply ground potential to the amplifiers.

With the origin of coordinates in the center of the plotting board, the plotting area represents all four of the quadrants about the gun. In many cases, the target may move wholly within one quadrant, and it is advantageous to use the whole plotting area to represent this one quadrant. Parallax voltages of the proper polarity and magnitude may be supplied to the motor amplifiers to displace the origin of coordinates to one corner of the plotting area and the scale factor of yards per volt of movement of the pens appropriately changed to enable the pens to cover the whole area.

A grounded source 1102 is connected to the contacts of a switch 1103. The blade of switch 1103 is connected to ground through the potential dividing resistors 1104, 1106, 1107, 1108, 1109. The junctions of these resistors are respectively connected to the contacts of switch 1105. The blade of switch 1105 is connected through resistor 1136 to the input circuit of amplifier 1135, and through resistor 1171 to the input circuit of amplifier 1175. Switch 1103 is moved to select a voltage of the proper polarity, and switch 1105 is moved to select a voltage of the proper magnitude which, when supplied to amplifiers 1135, 1175 will appropriately displace the origin of the X coordinates. Similarly, the sources 1117, switches 1118, 1120, and resistors 1119, 1121, 1122, 1123, 1124 through resistors 1151, 1187 supply voltages to amplifiers 1150, 1190 to displace the origin of the Y coordinates.

For the normal voltage scale, switch 1128 is placed on the upper contacts. Thus, the brush of potentiometer PT38 is connected to ground through resistor 1126 and through resistor 1125 in parallel with switch 1128 and resistor 1127 and is connected through resistor 1134 to amplifier 1135. To change the voltage scale without changing the impedance connected to the brush, switch 1128 is moved to the lower contacts, so that the brush is connected to ground through resistors 1126, 1125 in series, in parallel with the switch 1128 and resistor 1127, and the junction of resistors 1125, 1126 is connected through resistor 1134 to amplifier 1135.

Similarly, the brush of potentiometer PT39 is connected to ground and to amplifier 1150 through switch 1157 and resistors 1152, 1158, 1159, 1160; the brush of potentiometer PT40 is connected to ground and to amplifier 1175 through switch 1165 and resistors 1116, 1162, 1164, 1170; and the brush of potentiometer PT41 is connected to ground and to amplifier 1190 through switch 1197 and resistors 1188, 1194, 1195, 1196.

If resistors 1126, 1127, 1134 have equal resistances R, and the desired voltage ratio is $m$, then, neglecting the resistance of the winding of card 3801, PT38, the resistance of resistor 1125 will be $$\frac{R}{m-2}$$

For a voltage ratio of two, resistor 1125 may be short-circuited, and for a ratio of eight, resistor 1125 may have a resistance of $$\frac{R}{6}$$

Military maps are usually subdivided by a gridiron of lines into map squares, each square representing, to the scale chosen, a definite area. The map squares may represent an area of say 6,000 yards a side. The larger guns have ranges of 20,000 to 30,000 yards. Thus, the field of fire of a gun may extend over an area represented by a number of map squares. In this case, the voltage scale of the plotting board may be so chosen that the area of the board represents an area of say 9,000 yards a side. Slow-moving targets may be in the area represented by a map square for some time. Thus, the full area of the board is made to represent a map square, with a reasonable overlap on each side. The switches 1105 and 1120 are moved to select voltages which will cancel a portion of the coordinate voltages, and leave unchanged only the portion of the coordinate voltages which represents the movement of the target in the desired map square.

*Overload*

When the observing equipment is rapidly slewed to pick up a new target, the plotting pens should be disabled so that they will not trace meaningless lines on the plotting surface. This disabling of the pens may conveniently be controlled by the motor control circuits 331, 332, 352, 353, which are of the type shown in Fig. 9. Current from the source 919 flows through the sections of the winding of transformer 920, from the anodes to the cathodes of the amplifying tubes 917, 918 and through resistor 916, making the cathode end of resistor 916 positive with respect to ground and negatively self-biasing the control electrodes of the tubes 917, 918 with respect to ground, reducing the anode currents to a small value. The positive waves of the alternating voltages supplied by transformer 915 to the control electrodes of tubes 917, 918 reduce these negative biases and cause the anode currents to increase, increasing the positive voltage with respect to ground of the cathode end of resistor 916. Thus, when the servosystem is unbalanced and alternating power is being supplied to the motor, the positive potential of the cathode end of resistor 916 increases substantially proportionally with the degree of unbalance.

The biasing resistor of the control circuit 331, Fig. 11, is connected through resistor 333 to one end of the winding of card 4201, potentiometer PT42; and the biasing resistor of circuit 332 is similarly connected through resistor 334 to the winding of card 4201, PT42.

A grounded source of voltage 339 has its negative pole connected through resistors 338, 337 to the other end of the winding of card 4201, PT42. The resistances of resistors 338, 337, 334, 333 are so selected that, when the servosystem is in balance, the lower end of the winding of card 4201, PT42 is negative, and the upper end is positive, with respect to ground. The cathode of an amplifying tube 335 is grounded and the control electrode is connected to the brush of potentiometer PT42. A transformer 340 has the primary winding connected to a suitable source of power (not shown) and the secondary winding connected from the cathode of tube 335 through the winding of relay 336 to the anode. The brush of potentiometer PT42 is adjusted so that, for normal unbalance of the servosystem, the anode current of tube 335 is too small to operate relay 336. When the servosystem is abnormally unbalanced, as during a slew, the positive voltages from the motor control circuits 331, 332 reduce the bias on the control electrode of tube 335, increasing the anode current and operating relay 336.

The motor control circuits 352, 353 are similarly connected by resistors 344, 346 to the windings of card 4301, potentiometer PT43, which is connected through resistors 342, 341 to the source 339. The cathode of an amplifying tube 345 is grounded, the control electrode is connected to the brush of potentiometer PT43 and the anode is connected through the winding of relay 343 to transformer 340. When the servosystems are unbalanced, the voltages from the control circuits 352, 353 cause relay 343 to operate.

Figure 23:
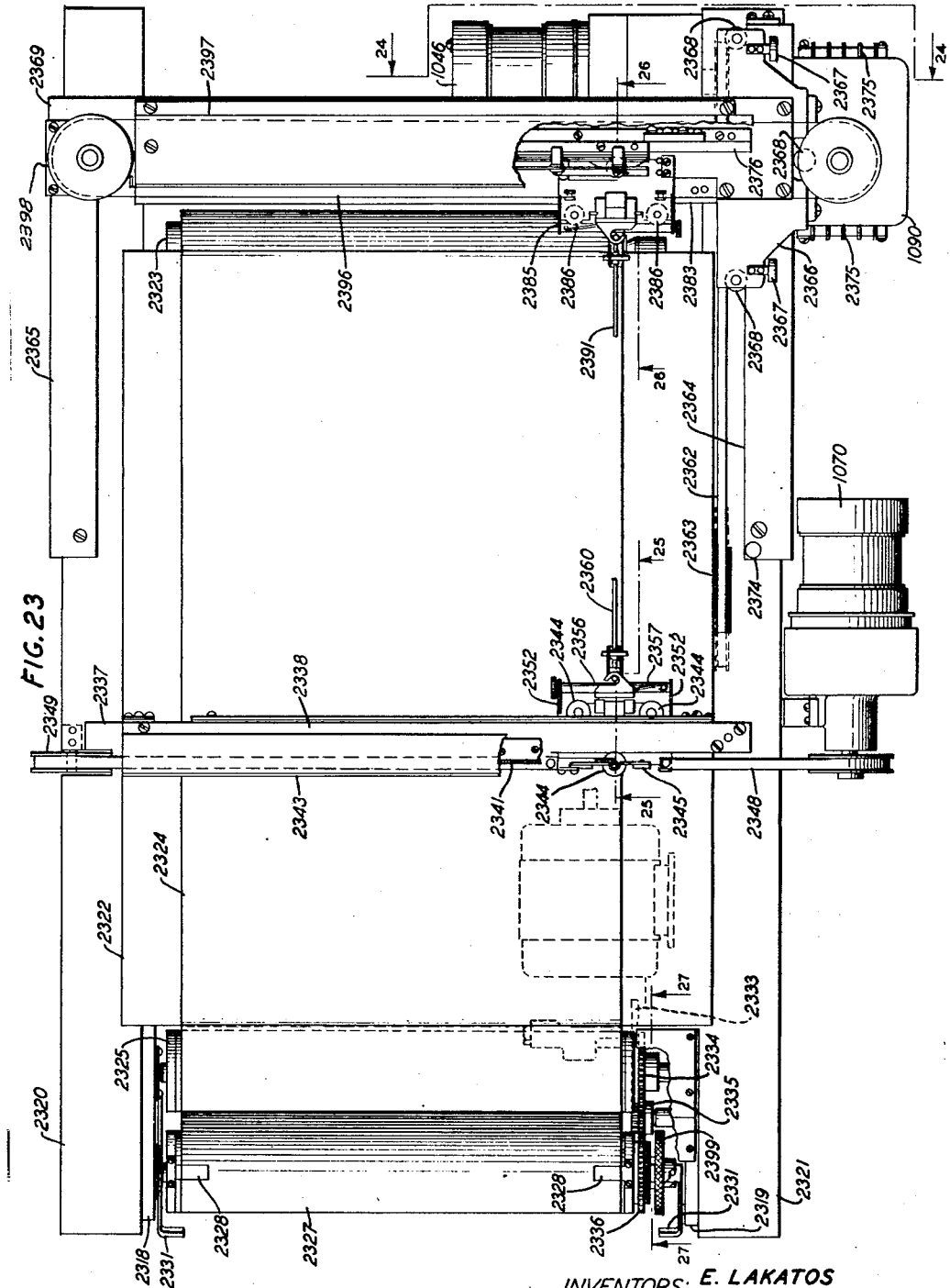
Fig. 23 is a top view in part section of a board, associated with the computer, for plotting the vertical position of the target.

In this system, the pens may be of the type shown in Fig. 23, in which the pens are drawn down to the plotting surface by electromagnets, such as the electromagnets 350, 351. A grounded source of power 354 is connected through the break springs of relay 336, the third contact of switch 349 and the winding of the electromagnet 350 of the left pen. When, due to abnormal unbalance of the system, relay 336 is operated, it breaks the circuit of the electromagnet 350, permitting the left pen to be raised from the paper. Similarly, the source 354 is connected to ground through the break springs of the relay 343 the third contact of switch 348 and the winding of electromagnet 351 controlling the right pen.

When using pens of the type shown in Fig. 17, in which the pens are normally in contact with the plotting surface and are raised by the energization of the electromagnets, the break springs of relays 336, 343 may be replaced by make springs which normally maintain open the circuits to the electromagnets. When relays 336, 343 are energized, they complete the circuits to the electromagnets, lifting the pens from the surfaces.

Switches 1198 and 348 are ganged together, as are switches 1199 and 349. In the first position of these switches, the coordinate voltages are cut off by relays 1144, 1180 and the pens are up; in the second position, relays 1144, 1180 are released supplying coordinate voltages to the amplifiers 1135, 1150, 1175, 1190 but the pens are still raised; and in the third position the system is in condition for plotting.

*Marking*

In order to be able to identify corresponding points on the plotted traces of the present and predicted positions of the target, voltage pulses may be supplied to the motor summing amplifiers to temporarily deflect the pens and produce V-shaped marks in the traces, The predicted position trace is first marked, say when the gun is fired, thus marking the point which the target should reach after the lapse of the time of flight of the shell. Then, after the lapse of the time of flight of the shell, or, when the burst or splash of the shell is observed, the then present position trace is marked. If the marks coincide, the prediction was correct; if the marks do not coincide, the discrepancy indicates in what respect the prediction was at fault, and what type of prediction should be used for subsequent shots. If the marks coincide, but the target was not hit, the prediction was correct, but some of the ballistic corrections were erroneous, and these may be corrected, or a spot correction introduced.

A grounded source of power 1023, Fig. 10, is connected to ground through the winding of relay 1024 and the break contact of the fourth pile-up of relay 1026, holding relay 1024 operated, and fully magnetizing the core of relay 1024. When the gun is fired, switch 1025 is operated, completing a circuit from source 1023 through the winding of relay 1026, operating relay 1026 and opening the operating circuit of relay 1024 at the break springs of the fourth pile-up, but as relay 1024 is slow releasing, it does not immediately release. Relay 1026 locks up from source 1023 through its winding, make springs of third pile-up of relay 1026 and make springs of second pile-up of relay 1024. A subsequent, accidental operation of switch 1023 before relay 1024 has released will thus not cause a second mark to be made. Switch 1028 is placed on the lower contact. The operation of relay 1026 completes a circuit from a grounded source of power 1027 through the make contacts of the second pile-up of relay 1026, the break contacts of the first pile-up of relay 1024 and switch 1028 to the make contacts of the sixth pile-up of relay 1015 and the break contacts of the seventh pile-up of relay 1015. If the right pen is plotting the predicted position, relay 1015 is unoperated and the connection is extended through the break springs of the seventh pile-up to connection 1008; if the left pen is plotting the predicted position, relay 1015 will be operated and the connection will be extended through the make springs of the sixth pile-up to connection 1004.

Connection 1004 extends through resistor 1111, Fig. 11, to the blade of switch 1112. The contacts of switch 1112 are connected through resistor 1141 to the input circuit of amplifier 1135 and through resistor 1145 to the input circuit of amplifier 1150, and to ground through resistors 1142, 1143 which adjust the magnitude of the applied voltage. Preferably the deflection of the pen in marking should be at right angles to the motion of the pen, but, as the target may move in any direction, this ideal condition cannot always be attained. The operator sets switch 1112 to supply the marking voltage to the X amplifier 1135, or the Y amplifier 1150, depending upon the direction of target motion. When plotting with an enlarged voltage scale, switch 1110 is closed, short-circuiting resistor 1111 to appropriately increase the voltage supplied to the amplifiers. Switch 1110 may thus be ganged with switches 1128 and 1157.

Connection 1008 similarly extends through resistor 1115, switch 1116 and either resistors 1177, 1178 to the input circuit of amplifier 1175 or resistors 1179, 1182 to the input circuit of amplifier 1190. Switch 1114 may be ganged with switches 1165 and 1197.

During the marking, the pen affected must be kept in contact with the paper, even though the marking voltage temporarily unbalances the system. The operation of relay 1026, Fig. 10, prepares a circuit from a grounded source of voltage 1022 through the make springs of the first pile-up of relay 1026, break springs of the twelfth pile-up of relay 1015, connection 1013 to the junction of resistors 341, 342, Fig. 11, to increase the bias on the control electrode of tube 345 and prevent the operation of relay 343.

When relay 1015, Fig. 10, is operated, the circuit extends through the make springs of the first pile-up of relay 1015 to connection 1005, and the junction of resistors 337, 338, Fig. 11, increasing the bias on the control electrode of tube 335 preventing the release of relay 336.

Relays 1018, 1020, Fig. 10, are respectively connected similarly to relays 1024, 1026 and operate in a similar manner. When the burst or splash of the shell is noted, switch 1019 is closed, operating relay 1020 to connect the source 1022 through the make springs of the third pile-up of relay 1020, the break springs of the second pile-up of relay 1018, switch 1021, and either the break springs of the sixth pile-up of relay 1015 to connection 1004, or the make springs of the seventh pile-up of relay 1015 to connection 1008, thus marking the pen making the trace of the present position of the target. Preferably, the sources 1022, 1027 are of opposite polarities so that the marks formed in the traces of the predicted and present positions may be readily identified.

When the guns are firing at a rapid rate, it is not easy to correlate the firing of a particular gun and the subsequent burst of the shell. In such cases, the traces of the predicted and present positions may be automatically marked, either at regular intervals or in some desired pattern. A device for automatically marking the traces is shown in Figs. 20, 21, 22.

A constant speed motor 2002, mounted on the base 2011, is geared by gear 2003 to the train of gears 2004, 2005, 2006, 2007, journalled in the supports 2012, 2013. A potentiometer, PT31, is mounted on the rear of support 2013 with the shaft 2014 journalled in the support 2012. A disc 2008, is rotatably mounted on the shaft 2014 and geared to gear 2007. Pins 2009 spaced regularly, or in some desired pattern, are mounted in the disc 2008. A switch 2010 is mounted on the base 2011 and is actuated by the inner ends of the pins 2009. Motor 2002 thus will actuate switch 2010 in accordance with the pattern of the pins 2009.

A servomotor 2015 is mounted on the base 2011 and geared by gears 2016, 2017, 2018, 2019, 2020, journalled in the supports 2012, 2013, to gear 2021, affixed to shaft 2014, driving the brush of potentiometer PT31. An arm 2022 affixed to shaft 2014 carries a switch 2023, actuated by the outer ends of the pins 2009.

In Fig. 10, the constant speed motor 2002 drives the disc 2008 to cause the pins 2009 to actuate switch 2010 completing circuits from the grounded source of power 1029 through switch 2010, switch 1021, and springs of relay 1015 to the amplifier controlling the pen tracing the present position of the target, and through the springs of relay 1015 and connections 1005 or 1013 to the pen lift amplifiers.

The brush associated with card 2315, PT23, Fig. 8, is connected by connection 641, Figs. 8, 7, 10, through resistor 1037 to the input circuit of amplifier 1035, having feedback resistors 1031, 1034, and supplies a voltage proportional to $-b(t)$. The output circuit of amplifier 715, Fig. 7, is connected by connection 759, Figs. 7 and 10, to ground through resistors 1038, 1039, winding of card 3101, potentiometer PT31 and resistor 1040. A grounded source of power 1041 is connected through resistor 1042 to the junction of resistors 1038, 1039. The brush of potentiometer PT31 is connected through resistor 1036 to the input circuit of amplifier 1035. The output circuit of amplifier 1035 is connected to a control circuit 1043, of the type shown in Fig. 9, controlling the motor 2015. The winding of card 3101, PT31, has a variation in resistance similar to the variation of card 2315, PT23, Fig. 8. The voltage supplied to amplifier 1035 (Fig. 10) by connection 641 is proportional to $-b(t)$, and the voltage supplied by the brush of potentiometer PT31 is of the form $+b(t)$, thus the output voltage of amplifier 1035 should be zero. If the output voltage is not zero, motor 2015 will move the brush of potentiometer PT31, varying the value of $+b(t)$ to make the output voltage zero, thus moving arm 2022 and switch 2023 around the circumference of disc 2008 a distance from switch 2010 proportional to the time of flight of the shell. The pins 2009 thus operate switch 2023 a time interval equal to the time of flight before they operate switch 2010, completing a path from a grounded source of voltage 1029, switches 2023, 1028 and springs of relay 1015 to the amplifier controlling the pen tracing the predicted position of the target, and a path from the source 1029, springs of relay 1015 and connections 1013 or 1005 to the pen lift amplifiers. The resistor 1032, and capacitor 1033 connected to ground from the junction of resistors 1031, 1034 stabilizes the motion of motor 2015.

*Vertical or H board*

The projections on the horizontal plane of the present and predicted positions of the target may conveniently be plotted by the X and Y rectangular coordinates; but the projections on a vertical plane, or planes, of the present and predicted positions of the target may be plotted in many systems of coordinates. The height may be plotted against the ground range, against the integral of the target speed, against the abscissa, X or Y, of the horizontal plot, or against time. In the present vertical board, the present height Ho of the target above the horizontal plane is plotted against time, and the predicted height Hp is plotted against time plus the time of flight of the shell.

The vertical board may conveniently be mounted upon a metal cabinet containing the amplifiers and other apparatus associated with the control of the motors.

Sheet metal angles 2320, 2321 supported by webs 2318, 2319 attached to the top of the cabinet, support the plotting surface 2322, which may be of glass or metal. A paper supply roll, equipped with a simple friction clutch, is journalled in the webs 2318, 2319. As shown in Fig. 27, the strip of plotting paper 2324 is threaded over the surface 2322, partially around the drive roller 2325 and the idler roller 2326, thence around the take-up roll 2327 and under the spring clips 2328, 2328. The drive roller 2325 and take-up roll 2327 are journalled in the webs 2318, 2319. The idler roller 2326 is slidingly journalled in members 2329 attached to the webs 2318, 2319, and pressed into firm contact with the drive roller 2325 by springs 2330. The idler roller 2326 may be depressed by the levers 2331 while threading the paper over the rollers. The take-up roll 2327 may be rotated by the knurled nut 2399 to tighten the paper on the roll.

A constant speed motor 2332, energized by some suitable source such as a constant frequency oscillator or commercial power supply, is geared through a conventional worm gear reduction to gear 2333, which drives gears 2334, 2335, 2336. Gear 2335 is journalled in the web 2319, while gears 2334 and 2336 are respectively mounted on the shafts of, and drive, the roller 2325 and the roll 2327.

The speed of motor 2332 and the ratio of the gears connected to roller 2325 are selected to give a convenient motion of the paper. A speed of six seconds per inch movement of the paper will usually be sufficient, thus during a maximum of time of flight of the shell of 36 seconds, the paper will move six inches. For longer range guns, having longer times of flight, the distance moved by the paper during the time of flight may be increased, or the paper speed may be decreased.

A light rail 2337, machined flat on the edges, is mounted on the side angles 2320, 2321. The ends of the rail 2337 are bent through two right angles to form supports such that the rail 2337 is mounted a short distance above the plotting surface 2322. A U-shaped element 2338, Fig. 25, supported by a spacer 2339, is secured to the rail 2337. A linear card 3301, potentiometer PT33, Figs. 10 and 25, is insulatingly mounted in the element 2338 and secured by screws 2340. The ends of the winding of card 3301 are connected by wires (not shown) to the computing circuit. A conducting bar 2341 is insulatingly secured to the top of the element 2338; and a second conducting bar 2342 is insulatingly secured to the side of the element 2338. A light sheet metal cover 2343 may be secured to the element 2338 to protect the bar 2341.

Three flanged wheels 2344, bearing on the sides of the rail 2337, support a light sheet metal carriage 2345. A brush 2346, insulatingly supported by an ear formed in the carriage 2345, makes contact with the winding of card 3301 and is connected to a second brush 2347, also insulatingly supported by the ear formed in the carriage 2345, and rubbing on the bar 2341, through which the brush 2346 may be connected to the computing circuit.

A tape 2348, Fig. 23, is secured to the pen carriage 2345 and is threaded over the pulley of motor 1070, Figs. 10 and 23, through a hole in the angle 2321, under the plotting surface 2322, through a hole in the angle 2320, over the pulley 2349, journalled in the angle 2320, over the surface 2322 and is secured to the carriage 2345. The rotation of motor 1070 will thus move the pen carriage 2345 vertically proportionally to the present height of the target. A scale factor of 1000 yards per inch may conveniently be used, thus, with a plotting surface of 15 inches, the pen motion may represent to scale, target heights of —500 to 14,500 yards.

The pen raise magnet 2350, Fig. 25, may be mounted upon the upstanding portion of the carriage 2345. On end of the winding of the magnet 2350 is grounded through the carriage 2345 and rail 2339; the other end of the winding is connected to a brush 2351, insulatingly mounted on the carriage 2345 and bearing on the bar 2342. The bar 2342 may be connected through a switch (not shown) to a suitable power supply; or to a pen raise amplifier similar to the amplifiers 335, 345, Fig. 11.

The ends of the carriage 2345, Figs. 23, 25, are bent up to form upstanding wegs 2352. A U-shaped element 2353 is formed with depending ears pivotally supported by a pivot 2354 secured in the web 2352, and carries a pole-piece 2355, aligned with the pole of the magnet 2350. The arms of the element 2353 are pierced to form open V-shaped bearings 2356. Fig. 23. A cylindrical element 2358, Fig. 25, having stub shafts at each end rotatably mounted in the bearings 2356 is yieldably retained by a flat spring 2357, secured to the carriage 2345. A capillary pen 2360 is supported by a web 2359 secured to the element 2358 and dips into an ink reservoir 2361 supported by a clamp 2395 clipped to the carriage 2345. The axis of the element 2358 is inclined to the perpendicular, so that, if the pen 2360 strikes an obstruction, such as the other pen, the pen 2360 may rotate about the axis of the body 2358 and, at the same time, will be raised from the plotting surface, thus preventing injury to the pen and reducing the production of meaningless marks on the surface.

The drive for the predicted height pen is shown on Figs. 23, 24, 26. The time of flight motor 1046, Figs. 10, 23, 24 is affixed to the angle 2321, and drives a tape 2362 threaded over a pulley 2363 journalled in, and projecting above the angle 2321.

A pair of rails 2364, 2365 are mounted on the angles 2321, 2320. A pen arm carriage 2366 is supported by rollers 2367, riding on the top of the rail 2364 and is guided by rollers 2369, 2369 bearing on the sides of the rail 2364. The tape 2362 is attached at both ends to the carriage 2366 by screws (not shown), thus the carriage 2366 is moved proportionally to the time of flight. The gear ratio of motor 1046 is selected so that the pen arm carriage 2366 moves proportionally to the paper 2324, that is, to a scale factor of six seconds per inch, and the carriage 2366 has a maximum travel of some six inches, before encountering the stop 2374.

The motor 1090, Figs. 10, 23, 24 is supported by a flange screwed to the carriage 2366.

The card 3201, potentiometer PT32, Figs. 10, 24, is supported by clamps and screws 2371 in the channel 2370 affixed to the angle 2321. The ends of the winding of card 3201 are brought out to terminals, such as terminal 2317, which are wired to the computing circuits. A brush 2372 is insulatingly mounted on a bracket 2373 affixed to the frame of the motor 1090. The brush 2373 is connected to a terminal of connecting block 2375 mounted on motor 1090. The connecting blocks 2375, 2375 are cabled to the appropriate computing circuits.

The pen carriage arm 2369 is attached to the carriage 2366, extends across the plotting surface and is supported by a roller (not shown) riding on the rail 2365. An L-shaped bar 2376 is screwed to the arm 2369, and welded to the upper surface of bar 2376 is a second L-shaped bar 2377. Card 3501, potentiometer PT35, Figs. 10, 26, is insulatingly mounted against the face of bar 2377, and is retained by clamps 2378 and screws 2379. The ends of the winding of card 3501 are brought out to terminals, such as terminal 2381, Fig. 24, connected to the computing circuit. A conducting bar 2380, Fig. 26 is insulatingly mounted on the front of the clamps 2378, and a second conducting bar 2382 is insulatingly mounted on the bar 2376.

A rail 2383, machined on the sides and a spacer 2384 are mounted on the arm 2369. The pen carriage 2385 is supported by rollers 2386 bearing on the sides of the rail 2383. Brushes 2387, 2388 conductively connected and insulatingly mounted on the carriage 2385 respectively make contact with the winding of card 3501 and bar 2380. A pen raise magnet 2389 is mounted on the carriage 2385. One end of the winding of magnet 2389 is grounded to the carriage 2385, and the other end is connected to brush 2390 contacting rail 2382. The pen 2391 is supported by an element 2392, similar to the element 2353, Fig. 25, pivoted to the carriage 2385, Fig. 26. The pen 2391 dips into the ink reservoir 2393, supported by the clip 2394, clipped over a portion of the carriage 2385.

A tape 2396 is attached to carriage 2385, threaded over the driving pulley of motor 1090, and over a pulley 2398 journalled in the arm 2369 and attached to carriage 2385, so that the rotation of motor 1090 will slide the carriage 2385 vertically proportionally to the predicted height of the target. The gear ratio of motor 1090 is selected so that the motion of carriage 2385 has the same scale factor as the motion of carriage 2345.

The bar 2382, like the bar 2342, may be connected through a switch (not shown) to a suitable power supply; or to a pen raise amplifier, similar to the amplifiers 335, 345, Fig. 11.

A small panel may be mounted on the angle 2321, Fig. 23, to the left of the motor 1070 to carry the control switches, such as the switch to control the pen raise magnet; marking switches, such as the switches 1021, 1028, Fig. 10; pen centering switches, such as the switches 1066, 1035, Fig. 10; and, if desired, the target rate meter and handset rate potentiometer for the H coordinate, Fig. 5.

A light metal shield 2397, Fig. 26, may be attached to the arm 2369, to protect the pen carriage and connections. Light metal shields, not shown, may also be placed along the angles 2320, 2321 to protect the motors and connections.

In Fig. 10, connection 641 is connected through resistor 1054 to the input circuit of amplifier 1050, having feedback resistors 1043, 1049, and supplies a voltage proportional to $-b(t)$. Connection 759 is connected to ground through resistors 1038, 1044, winding of card 3201, PT32 and resistor 1045. A grounded source of power 1041 is connected through resistor 1042 to the junction of resistors 1038, 1044. The output circuit of amplifier 1050 is connected to a control circuit 1047 controlling motor 1046 driving the brush of potentiometer PT32. The brush of potentiometer PT32 is connected through resistor 1053 to the input circuit of amplifier 1059 and supplies a voltage varying proportionally to $+b(t)$. If the output voltage of amplifier 1059 is not zero, motor 1046 drives the brush of potentiometer PT32 until the output voltage is zero, and the brush of potentiometer PT32 has been moved a distance proportional to the time of flight. Resistor 1051 and capacitor 1052 connected to ground from the junction of resistors 1048, 1049 stabilizes the motion of motor 1046.

Connections 17, 807, 627, Fig. 7, are cabled to the vertical board, Fig. 10, and respectively supply voltages proportional to Ho, the present height of the target, the prediction based on the speed, or first derivative of the target motion, and the acceleration or second derivative of the target motion. Connection 17 is connected through resistor 1064 to the input circuit of amplifier 1060, having feedback resistors 1056, 1059 and through resistor 1081 to the input circuit of amplifier 1080, having feedback resistors 1073, 1076.

A grounded source of power 1062 is connected to the ends of the winding of card 3401, potentiometer PT34. The brush of potentiometer PT34 is adjusted to supply a voltage proportional to Hg, the vertical parallax of the gun, and is connected through resistor 1065 to the input circuit of amplifier 1060, and through resistor 1082 to the input circuit of amplifier 1080.

A grounded source of power 1055 is connected to ground through the winding of card 3301, potentiometer PT33. The brush of potentiometer PT33 is connected through resistor 1061 to the input circuit of amplifier 1060. The output circuit of amplifier 1060 is connected to the control circuit 1067, of the type shown in Fig. 9, controlling motor 1070 driving the brush of potentiometer PT33. The voltages supplied to amplifier 1060 are proportional to $-Ho-Hg$, the height of the present position of the target with respect to the gun, and, if the output voltage of amplifier 1060 is not zero, motor 1070 moves the brush of potentiometer PT33 until the output voltage is zero and the brush has been moved proportionally to the present height. Resistor 1057 and capacitor 1058 connected to ground from the junction of resistors 1056, 1059 stabilize the motion of motor 1070.

Connections 807 and 627 are respectively connected through resistors 1083, 1084 to the input circuit of amplifier 1080. A grounded source of power 1072 is connected to ground through the winding of card 3501, PT35. The brush of potentiometer PT35 is connected through resistor 1079 to the input circuit of amplifier 1080. The output circuit of amplifier 1080 is connected to a control circuit 1086, of the type shown in Fig. 9, controlling motor 1090 driving the brush of potentiometer PT35. The voltages supplied to the input circuit of amplifier 1080 are together equal to the predicted height of the target with respect to the gun, and, if the output voltage of amplifier 1080 is not zero, motor 1090 moves the brush of potentiometer PT35 until the output voltage is reduced to zero and the brush has moved a distance proportional to the predicted height.

One section of the source 1069 is connected to ground through the potential dividing resistors 1071, 1069. The junction of resistors 1069, 1071 is connected through resistor 1062 to the input circuit of amplifier 1060, and through resistor 1078 to the input circuit of amplifier 1080. The computer is adapted to compute the position of the target for elevation angles from +1,600 mils to −200 mils, thus the vertical board must be capable of plotting heights above the horizontal plane and below the horizontal plane. To avoid the necessity of supplying potentials of both polarities to cards 3301, 3501 the potential supplied from the junction of resistors 1069, 1071 is made slightly larger than the maximum negative height to be plotted and thus supplies a false zero which prevents the sum of this voltage and the coordinate voltages from changing sign.

The blade of switch 1021 is connected through resistor 1063 to the input circuit of amplifier 1060, and the blade of switch 1028 is connected through resistor 1079 to the input circuit of amplifier 1080, so the pens of the vertical board will be marked simultaneously with the pens of the horizontal board.

Resistors 1063, 1064, 1065 are connected to the blade of switch 1066, the first contact of switch 1066 is connected to the input circuit of amplifier 1060, and the second contact is grounded. Switch 1066 is moved to the second contact for testing the zero position of the pen, removing the coordinate and marking voltages from the input circuit of amplifier 1060, grounding these circuits to preserve the accuracy of operation of the computer, and leaving only the voltage from the junction of resistors 1069, 1071 supplied to amplifier 1060. Motor 1070 will then drive the brush of potentiometer PT33 to the position corresponding to this known voltage and the position of the pen may be checked.

Similarly, resistors 1079, 1081, 1082, 1083, 1084 are connected to the blade of switch 1085 and the contacts are connected to the input circuit of amplifier 1080 and to ground. When switch 1085 is moved to the second contact, cutting off all voltages but the voltage representing the false zero, the brush of potentiometer PT35 will be moved to the position corresponding to this known voltage and the position of the pen may be checked.

The spotting controls are claimed in application Serial No. 679,351, by W. H. Boghosian, H. G. Och and B. T. Weber; the control of the plotting pens is claimed in application Serial No. 679,352 by H. G. Och and D. B. Parkinson, both filed of even date herewith.

What is claimed is:

1. In a computer, a source of voltage, first means connected to said source and controlled in accordance with observations of the positions of a moving body to derive a first voltage proportional to the component along an axis parallel to one of the rectangular coordinate axes of the horizontal distance to the projection of the body, a first electrical network connected to said first means and energized by said first voltage to produce a second voltage proportional to the rate of change of said first voltage, a second electrical network connected to said first network and energized by said second voltage to produce a third voltage proportional to the rate of change of said second voltage, first fractionating means connected to said second network and adjusted by said computer to fractionate said third voltage proportionally to the square of a time interval, second fractionating means connected to said first network and adjusted by said computer to fractionate the second voltage proportionally to said time interval, and means connected to said first means and both said fractionating means to produce a fourth voltage proportional to the component of the predicted displacement of said body after the lapse of said time interval.

2. The combination in claim 1 with a first plotting device, mechanism connected to said first means and energized by said first voltage to move said first device proportionally to said present component, a second plotting device, other mechanism connected to said first means and both said fractionating means and energized by fourth voltage to move said second device proportionally to the predicted component of said body after the lapse of said time interval.

3. In a computer including a source of voltage, means connected to said source and controlled in accordance with observations of the positions of a moving body to derive from said source a first voltage proportional to the component along an axis parallel to one of the rectangular coordinates of the horizontal distance to the projection of the body, a first electrical network connected to said means and energized by said first voltage to produce a second voltage proportional to the rate of change of said first voltage, a second electrical network connected to said first network and energized by said second voltage to produce a third voltage proportional to the rate of change of said second voltage, first fractionating means connectable to the output of said second network and adjusted to fractionate said third voltage proportionally to the square of a time interval, second fractionating means connected to the output of said first network and adjusted to fractionate the voltage from said network proportionally to said time interval, means connected to said source and both said fractionating means to add the voltages and switching means for, at will, connecting said second network to said first fractionating means.

4. The combination in claim 3 with a relay having a winding connected across the output of said second network and springs connected to operate said switching means.

5. In a computer including a source of voltage and means connected to said source and controlled in accordance with observations of the positions of a moving body to derive from said source first and second voltages respectively, proportional to the components of the horizontal speed of said body along rectangular coordinates originating at the point of observation, a first potentiometer having a winding connected across said source and a pair of brushes manually adjustable to select voltages of opposite polarities proportional to said horizontal speed, a second potentiometer having a winding varying in resistance with a sinusoidal function connected at diametrically opposite points to said pair of brushes, the points on said winding where said function passes through zero being grounded and a second pair of brushes contacting said winding and manually adjustable to select third and fourth voltages approximately proportional to said components of the speed, a pair of networks respectively connected between said third and fourth brushes and said means to oppose said first and third and said second and fourth voltages, a meter connected to both said networks to indicate inequality of said first and third and of said second and fourth voltages, a utilization circuit in said computer, and switching means for, at will, connecting the sources of said first and second, or of said third and fourth voltages to said utilization circuit.

6. The combination in claim 5 in which each of said networks includes four rectifying elements connected to form a double wave bridge, and said meter has two windings respectively connected to the diagonals of said bridges.

7. The combination in claim 5 with a plotting device and mechanism connected to said utilization circuit and controlled in part by the voltages from said utilization circuit to plot the predicted positions of said body.

8. The combination in claim 3 with switching means for connecting the output of said second network to said first network.

9. The combination in claim 8 with a potential divider, and switching means, for, at will, connecting said potential divider to said first fractionating means.

10. A computer for predicting a coordinate of the position of a body after the lapse of a time interval including means controlled in accordance with observations of the positions of the body to produce a first effect nominally varying proportionally to a coordinate of the present position of the body but having undesired perturbations, a first differentiator connected to said means and energized by said first effect to produce a second effect proportional to the rate of change of said first effect, first smoothing means having a substantial delay connected to said differentiator to smooth and weight the values of said second effect, first fractionating means connected to said smoothing means to fractionate the smoothed values of said second effect proportionally to said time interval, summing means connected to said first and said fractionating means to algebraically add said first and said fractionated effects to produce an effect proportional to one predicted value of the coordinate, a second differentiator connected to said first smoothing means and energized by said second effect to produce a third effect proportional to the rate of change of said second effect, second smoothing means connected to said second differentiator to smooth and weight the values of said third effect, second fractionating means connectable to said second smoothing means to fractionate the smoothed values of said third effect proportionally to the square of said time interval, third fractionating means, and shifting means for, at will, connecting said second smoothing means to said first smoothing means to supply to said first smoothing means a sufficient amount of said smoothed third effect to compensate for the delay in said first smoothing means, for, at will, connecting said second fractionating means from said second smoothing means to said summing means to add to said predicted effect an effect proportional to the full output of said second fractionating means, and, at will, to connect said second fractionating means to said second smoothing means and to connect said third fractionating means from said second fractionating means to said summing means to add to said predicted effect an effect proportional to a fraction of the output of said second fractionating means.

11. The combination in claim 10 with a first plotting device, mechanism connected to said first means and controlled by said first effect to move said first device proportionally to the coordinate of the present position of the body, a second plotting device, and mechanism connected to said summing means and controlled by the sum of said effects to move said second device proportionally to the coordinate of the predicted position of the body.

12. In a computer controlled in accordance with observations of the positions of a moving body to form the source of a first quantity of energy proportional to the component of the displacement of the body along an axis parallel to one of the rectangular coordinates through the observation point, first means connected to said source to produce a second quantity of energy proportional to the rate of change of said first quantity, second means connected to said first means to produce a third quantity of energy proportional to the rate of change of said second quantity, means connected to said second means and controlled by said computer to modify the magnitude of said third quantity proportionally to the square of a time interval, other means connected to said first means and controlled by said computer to modify said second quantity proportionally to said time interval, means connected to said source and both said modifying means to algebraically sum said first and both said modified quantities of energy, a first plotting device, mechanism connected to said source and energized by said first quantity of energy to move said first device proportionally to the component of the present displacement of the body, a second plotting device, other mechanism connected to said summing means and energized by the sum of said quantities of energy to move said second plotting device proportionally to the component of the predicted displacement of the body after the lapse of said time interval.

13. Means for obtaining a smothed weighted average of the rate of change of a voltage nominally varying at a constant rate but having undesired perturbations comprising a first capacitor connected to the source of the voltage, an amplifier having grounded input and output circuits, first and second resistors connecting said first capacitor to the input circuit, a second capacitor connected from the junction of said first and second resistors to ground, third and fourth resistors connected from the output to the input circuit, and a third capacitor in serial relationship with a fifth resistor connected from the junction of said third and fourth resistors to ground.

References Cited in the file of this patent

UNITED STATES PATENTS

| Number | Name | Date |
|---|---|---|
| 2,027,926 | Myers et al. | Jan. 14, 1936 |
| 2,385,952 | Svoboda | Oct. 2, 1945 |
| 2,404,011 | White | July 16, 1946 |
| 2,408,081 | Lovell et al. | Sept. 24, 1946 |
| 2,414,819 | Lakatos | Jan. 28, 1947 |

FOREIGN PATENTS

| Number | Country | Date |
|---|---|---|
| 612,618 | Germany | Apr. 29, 1935 |